United States Patent
Nishi et al.

(10) Patent No.: US 7,280,449 B2
(45) Date of Patent: Oct. 9, 2007

(54) OPTICAL HEAD AND RECORDING AND/OR REPRODUCING APPARATUS

(75) Inventors: Noriaki Nishi, Tokyo (JP); Masaru Tezuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 10/794,336

(22) Filed: Mar. 4, 2004

(65) Prior Publication Data

US 2004/0223435 A1    Nov. 11, 2004

(30) Foreign Application Priority Data

Mar. 7, 2003    (JP) ............................. 2003-062574

(51) Int. Cl.
*G11B 7/13* (2006.01)
(52) U.S. Cl. .............. 369/44.41; 369/112.21; 369/120
(58) Field of Classification Search .............. 369/53.2, 369/120, 112.21; *G11B 7/00*
See application file for complete search history.

(56) References Cited

U.S. PATENT DOCUMENTS

| | | | |
|---|---|---|---|
| 5,278,401 A | 1/1994 | Takishima et al. | |
| 5,787,060 A | 7/1998 | Ando | |
| 6,327,231 B1 | 12/2001 | Sano et al. | |
| 6,327,235 B1 * | 12/2001 | Hayashi | 369/59.1 |
| 6,418,095 B1 | 7/2002 | Sano et al. | |

FOREIGN PATENT DOCUMENTS

| | | | |
|---|---|---|---|
| JP | 2000-235715 | * | 8/2000 |
| WO | WO 00/39792 | | 7/2000 |

OTHER PUBLICATIONS

MAT (machine assisted translation of) JP 2000-235715.*
"Simple Mo Head with Integrated Data and Servo Detection", *IBM Technical Disclosure Bulletin*, vol. 41, No. 1, Jan. 1998, pp. 519-521.
Producing Linear Focus Error Signals in Optical Storage, *IBM Technical Disclosure Bulletin*, vol. 34, No. 10B, Mar. 1, 1992, pp. 228-229.

* cited by examiner

*Primary Examiner*—A M Psitos
(74) *Attorney, Agent, or Firm*—Oblon, Spivak, McClelland, Maier & Neustadt, P.C.

(57) ABSTRACT

An optical head in which pre-formatted signals may be detected as variations in the amplitude or the phase in the pre-formatted signals are suppressed, and a recording and/or reproducing apparatus employing the optical head, are disclosed. The optical head includes a light source 212, an objective lens 220 for condensing a light beam radiated from the light source 212 on a recording track of an optical recording medium 102, and a photodetector unit 223 for receiving the light beam reflected back from said recording track. The photodetector unit 223 includes a first light receiving section 230$b$ and a second light receiving section 230$c$. With a track pitch Tp of the optical recording medium, the wavelength λ of the light beam radiated from the light source 212, the numerical aperture NA of the objective lens and with $\lambda/(Tp \cdot NA) \geq 4/3$, the first light receiving section receives the light of one of two light spot areas lying on both sides of a center area of a light spot of the reflected light beam passing through the center of the light spot for extending along the length of the recording track. The second light receiving section receives the light of the other of the two light spot areas.

15 Claims, 14 Drawing Sheets

PUSH-PULL DETECTION WITH INTERVAL(OUT OF PHASE)

AFTER ERROR CORRECTION

NO ERROR CORRECTION

INTERVAL AREA RATE(22.5%)

AFTER ERROR CORRECTION

NO ERROR CORRECTION

INTERVAL AREA RATE(32.5%)

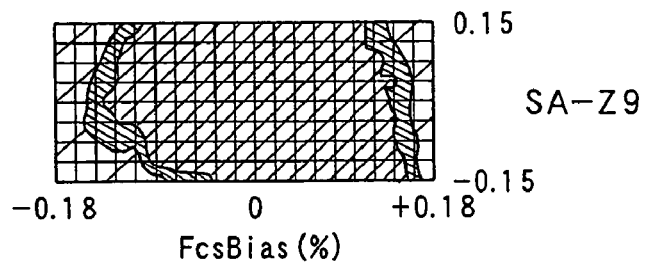
FIG. 13A AFTER ERROR CORRECTION
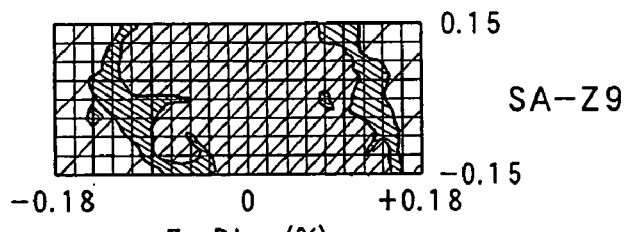
FIG. 13B NO ERROR CORRECTION
INTERVAL AREA RATE (42.5%)
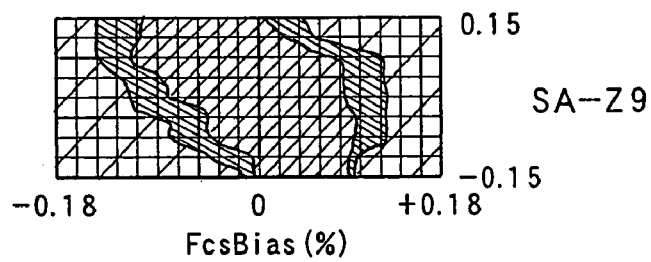
FIG. 14A AFTER ERROR CORRECTION
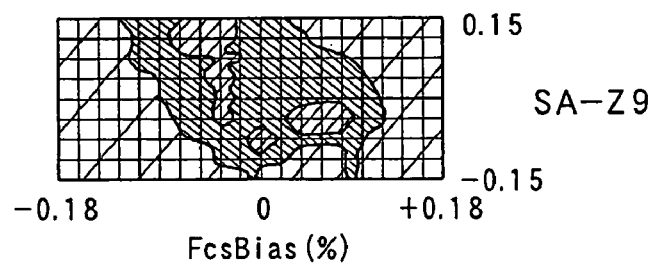
FIG. 14B NO ERROR CORRECTION
INTERVAL AREA RATE (0%)

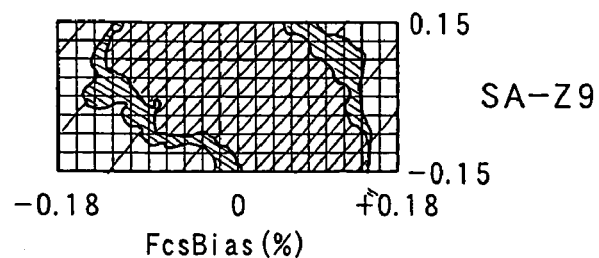
FIG. 15A  AFTER ERROR CORRECTION
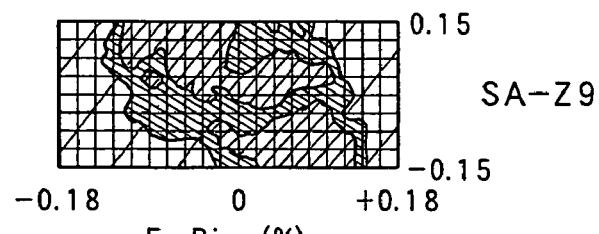
FIG. 15B  NO ERROR CORRECTION
INTERVAL AREA RATE (22.5%)
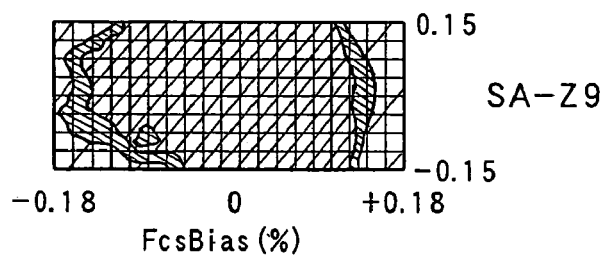
FIG. 16A  AFTER ERROR CORRECTION
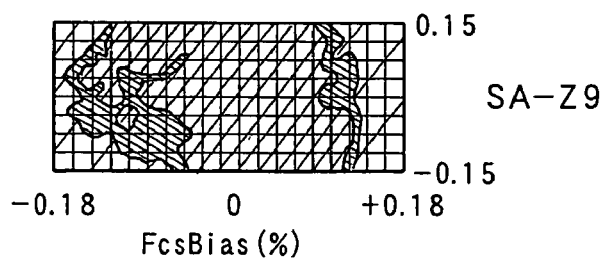
FIG. 16B  NO ERROR CORRECTION
INTERVAL AREA RATE (32.5%)

AFTER ERROR CORRECTION

NO ERROR CORRECTION

INTERVAL AREA RATE (42.5%)

In phase

Out of phase $\frac{\lambda}{Tp \cdot NA}$   $\frac{\lambda}{Tp \cdot NA}$ $\frac{\lambda}{Tp \cdot NA}$   $\frac{\lambda}{(2Tp) \cdot NA}$   $\frac{\lambda}{(2Tp) \cdot NA}$   $\frac{\lambda}{Tp \cdot NA}$

OPTICAL HEAD AND RECORDING AND/OR REPRODUCING APPARATUS

BACKGROUND OF THE INVENTION

1. Field of the Invention

This invention relates to an optical head for writing and/or reading out information signals for an optical recording medium, and to a recording and/or reproducing apparatus for recording and/or reproducing information signals for the optical recording medium using the optical head.

2. Description of Related Art

Up to now, there have been provided a large variety of optical recording mediums, including a replay-only optical disc, including information signals, such as audio signals, video signals or programs, prerecorded thereon, a recordable (R) optical discs, capable of writing the information signals only once, such as DVD-R or DVD+R, rewritable (RW) optical discs, capable of repeatedly rewriting the information signals, such as DVD-RW or DVD+RW, and magneto-optical discs. These discs may also each be rotationally accommodated within a disc cartridge.

In a disc substrate of the optical recording medium, which permits signal writing thereon, such as the recordable disc, rewritable disc or the magneto-optical disc, a guide groove(s), known as a (pre) groove(s), is formed concentrically or spirally about the center opening of the disc as the center. A recording track(s) is formed in register with this groove. The area defined between neighboring grooves or neighboring turns of the groove is termed a land, which may also be used as a recording track.

In an optical head for writing and/or reading out information signals for the optical recording medium, including the groove, formed therein, a light beam radiated from a light source is condensed by an objective lens on a recording track, and a tracking operation is performed in order to cause a spot of the light beam, condensed by the objective lens, to follow the recording track, based on a signal obtained from the light beam reflected and diffracted by the recording track.

In certain types of these optical recording mediums, there is formed a wobbling groove for meandering (wobbling) with a preset period, for providing a wobbled recording track which per se carries the recording clocks, address information or the information relevant to the optical recording mediums. That is, in these types of the optical recording mediums, the aforementioned information is recorded as wobble signals, corresponding to the above information, modulated by wobbling, on the recording track. For example, in the optical discs, exemplified by the DVD+RW or the Blue-Ray Disc, the address signals by wobble signals, different in frequency or in phase, are superimposed on mono-tonal clock signals obtained by high frequency wobbling, for recording the address timing information as wobble signals to extremely high precision. These wobble signals may be detected in accordance with a push-pull method, that is, by receiving the light beam, reflected and diffracted by the recording track, by a photodetector device, split in two light receiving sections along a splitting line extending along the recording track, and by taking the difference of outputs from the two light receiving sections of the so split photodetector device.

Meanwhile, the modulated signals, by the aforementioned wobbling, are modulated, in many cases, by MSK (minimum shift keying) or PSK (phase shift keying), which is a sort of the FSK (frequency shift keying), often used in for example the digital signal transmission.

However, in the modulation used for an optical recording medium, as distinct from the modulation used in e.g. the communication, characteristic signal deterioration may be produced in the wobble signals, as detected by the optical head, in case wobbling is applied to both the neighboring recording tracks. Specifically, the variations in the amplitude or the phase, known as beat or crosstalk, are produced in the aforementioned wobble signals due to the interference between the neighboring recording tracks caused by the difference in the wobbling applied to these recording tracks.

The most outstanding example is the phenomenon known as "beat" in which, due to periodic changes in the phase relationship of the wobbling from the difference between the inner and outer rims of two neighboring recording tracks, the wobble amplitude for the out-of-phase state shown in FIG. 23B is increased by a factor of approximately two, from that for the in-phase state shown in FIG. 23A, even in a standard condition substantially free of e.g. the aberration, thus producing periodic amplitude variations in the wobble signals.

Specifically, when the wobbling of a given recording track is in-phase with the wobbling of the recording track neighboring thereto, wobbling proceeds as the distance between the centerlines of two neighboring tracks remains coincident with the track pitch. Thus, the light beam reflected and diffracted by the recording track contains the diffracted light deviated by $\lambda/(Tp \cdot NA)$ from the main light beam in a direction perpendicular to the recording track. In the above formula, Tp is the track pitch of the optical recording medium, $\lambda$ is the wavelength of the light beam radiated from the light source, and NA is the numerical aperture of the objective lens.

On the other hand, if the wobbling of two neighboring tracks is out of phase to each other, the distance between the centerline of one of the recording tracks and the centerline of another recording track neighboring to the other of the recording tracks is constant and equal to twice the inherent track pitch Tp, with the recording track sandwiched between both side recording tracks deviating from the centerlines of the both side recording tracks. Thus, there persists the diffracted light deviated by $\lambda/(2Tp \cdot NA)$ from the main light beam, in a direction perpendicular to the recording track, in addition to the diffracted light deviated by $\lambda/(Tp \cdot NA)$, as shown in FIG. 24B. The result is that not only is the amplitude of the wobble signal changed, but changes in the in-spot intensity distribution different from those for the in-phase state are produced.

The changes in the amplitudes of the wobble signals produced when the wobbling of a given recording track and that of the neighboring recording track are in phase and out of phase with each other were calculated by computer simulation. The results of the calculations are shown in FIGS. 25 and 26.

Meanwhile, the graphs shown in FIGS. 25 and 26 show two-dimensional distribution, indicating changes in the wobble amplitudes, based on Z4 (defocusing) and Z9 (spherical aberration) in the Fringe-Zernike's aberration polynomial as the reference.

The "Fringe-Zernike's aberration polynomial" is now briefly explained. This polynomial is effective in representing the wavefront, because of orthogonality within the extent of a unit circle defined by a radius-azimuth polynomial of a circle, and is used often in an interferometer. If the wavefront is represented using this polynomial, for a unit circle with a radius 1,

| | |
|---|---|
| Z1 × 1 | piston |
| +Z2 × Rcos(A) | tilt |
| +Z3 × Rsin(A) | tilt |
| +Z4 × (2R² − 1) | defocus |
| +Z5 × R²cos(2A) | astigmatism in the 0° direction |
| +Z6 × R²sin(2A) | astigmatism in the 45° direction |
| +Z7 × {(3R³ − 2R)cos(A)} | coma aberration (+tilt) |
| +Z8 × {(3R³ − 2R)sin(A)} | coma aberration (+tilt) |
| +Z9 × (6R⁴ − 6R² + 1) | spherical aberration (+defocus) |
| + . . . | | where R is the distance along the radial direction and A is the angle of rotation.

Meanwhile, in this computer simulation, calculations were conducted with the wavelength λ of 405 nm, the numerical aperture NA of the objective lens equal to 0.85, the track pitch Tp of the optical recording medium of 0.32 µm and with the wobble amplitude of ±10 nm. FIG. 27 depicts a graph showing changes in the amplitude of the usual push-pull signals, for reference sake.

For the in-phase case, shown in FIG. 25, the changes in the wobbling amplitude indicate two-dimensional distribution similar to the usual changes in the push-pull amplitudes shown in FIG. 27. Conversely, for the out-of-phase case, shown in FIG. 26, the changes in the wobble amplitudes indicate non-symmetrical distribution, having a gradient in an orientation two-dimensionally different from the gradients in the graphs shown in FIGS. 25 and 27.

Thus, the wobbling phase relationships of the neighboring recording tracks are periodically deviated from the in-phase state to the out-of-phase state and vice versa due to the difference between the circumference of the inner rim and that of the outer rim of the disc. As a consequence, periodic variations produced in the wobble signals may be grasped as approximately two-fold amplitude variations even in a standard state where the defocusing and spherical aberration are approximately nil. In the state where there persist defocusing and spherical aberration, there is produced a two-dimensional dissymmetry in the magnitude of the amplitude variations, due to the difference in the behavior to the defocusing and spherical aberration of the diffracted light deviated by λ/(2Tp−NA). The changes are approximately fourfold in the portions of (Def, SA)=(+, +), (−, −), as may be seen from FIGS. 25 and 27. In actuality, most of the phase states are the transition states which are neither the in-phase states nor the out-of-phase states. However, in a state deviated from the in-phase state, even to the smallest extent, similar non-symmetrical components are generated, if minor differences in the magnitude of the so generated non-symmetrical components are neglected.

If modulated components by MSK, as crucial signal components, add up to the mono-tonal wobble signal, which is the simple amplitude variations, the phase relationships of the neighboring recording tracks become more complex. That is, the MSK modulated signal portions per se represent signals having different frequencies, thus causing positive deviation in the phase of the wobbling of the neighboring recording track.

Thus, in the above-described optical head, complex variations ascribable to the deviations in the amplitude or in the phase are generated on detection of the wobble signals by the push-pull method, and hence the demodulated signals are degraded in quality, while an error rate of the preformatted signals, such as address signals or the disc information, is lowered. In addition, in a recording and/or reproducing apparatus provided with the above-described optical head for recording and/or reproducing information signals for the optical recording medium, there is produced a problem, such as delayed seek operations of the optical head or the overlooked recording errors, which might lead directly to overall deterioration in the performance of the apparatus.

On the other hand, the optical head for detecting the wobble signals is affected more seriously by the above problem if, in order to meet the demand recently raised for the high recording density, the track pitch of the optical recording medium is narrowed, because the relative wobble amplitude is then increased.

In addition, the optical head is in need of a two-dimensional margin for the spherical aberration and defocusing ascribable to an error in the thickness of the cover layer for an optical recording medium, such as the Blue-ray disc, in which it is attempted to increase the recording density by increasing the numerical aperture NA. However, in the conventional optical head in which, when the wobble signal is detected by the push-pull method, there is produced a variation in the amplitude or phase due to interference ascribable to the difference in the wobbling between the neighboring tracks, as described above, and the magnitude of the variation exhibits a two-dimensionally non-symmetrical behavior, there is produced a problem of more drastic decrease in the margin and dissymmetry. Moreover, in case of a recordable disc or a rewritable disc, signal characteristics are further deteriorated due to reflectance modulation by optical modulation recording marks.

Furthermore, in the optical head, similar problems are raised in connection with a multi-layered optical disc which is in need of a two-dimensional margin for spherical aberration and defocusing ascribable to an error in the thickness of the cover layer.

SUMMARY OF THE INVENTION

In view of the above-depicted status of the prior art, it is an object of the present invention to provide an optical head in which a preformatted signal with suppressed variations in the amplitude or phase is detected and in which attempts are made to increase the two-dimensional margin of the error rate with respect to the spherical aberration and the defocusing.

It is another object of the present invention to provide a recording and/or reproducing apparatus provided with the above-described optical head for enabling optimum recording and/or reproduction of information signals for the optical recording medium.

In one aspect, the present invention provides an optical head in which information signals are written and/or read out for a predetermined recording track of an optical recording medium, as pre-formatted signals, as the information pre-formatted by shifting the information in the transverse direction of the recording track, are push-pull detected from said optical recording medium. The optical head comprises a light source, an objective lens for condensing a light beam, radiated from the light source, to a recording track of the optical recording medium, and photodetector means for receiving the light beam reflected back from the recording track. The photodetector means includes a first light receiving section and a second light receiving section. With the track pitch Tp of the optical recording medium, the wavelength λ of the light beam radiated from the light source, the numerical aperture NA of the objective lens and with λ/(Tp·NA)≧4/3, the first light receiving section receives the light of one of two spot areas lying on both sides of a center area of a light spot of the reflected light beam passing through the center of the light spot for extending along the length of the recording track, while the second light receiving section receives the light of the other of the two light spot areas.

Thus, with the optical head according to the present invention, the first and second light receiving sections receive the light of one of two spot areas, lying on both sides of a center area of a light spot of the reflected light beam, and which extend through the center of the light spot along the length of the recording track, and the other spot area, respectively, so that signal components by the diffracted light generated in the center area of the light spot with a shift of $\lambda/(2Tp \cdot NA)$ may be removed, so that it becomes possible to suppress variations in the amplitude or phase in the push-pull detected pre-formatted signals. Moreover, it becomes possible to enlarge the two-dimensional margin of the error rate with respect to spherical aberration and defocusing.

In another aspect, the present invention provides a recording and/or reproducing apparatus for recording and/or reproducing information signals for an optical recording medium, on which the information is pre-formatted by shifting the information in the transverse direction of a recording track of the optical recording medium to form pre-formatted signals. The apparatus comprises an optical head for writing and/or reading out the information signals for a preset recording track as pre-formatted signals are push-pull detected from an optical recording medium. The optical head includes a light source, an objective lens for condensing a light beam, radiated from the light source, to a recording track of the optical recording medium, and photodetector means for receiving the light beam reflected back from the recording track. The photodetector means includes a first light receiving section and a second light receiving section. With the track pitch Tp of the optical recording medium, the wavelength $\lambda$ of the light beam radiated from the light source, the numerical aperture NA of the objective lens and with $\lambda/(Tp \cdot NA) \geq = 4/3$, the first light receiving section receives the light of one of two spot areas lying on both sides of a center area of a light spot of the reflected light beam and extending along the length of the recording track through the center of the light spot. The second light receiving section receives the light of the other of the two light spot areas.

With the recording and/or reproducing apparatus, according to the present invention, the first and second light receiving sections receive the light of one of two spot areas lying on both sides of a center area of a light spot of the reflected light beam and which extend along the length of the recording track through the center of the light spot, and the other spot area, respectively, and hence signal components by the diffracted light generated in the center area of the light spot with a shift of $\lambda/(2Tp \cdot NA)$ may be removed, so that it becomes possible to suppress variations in the amplitude or phase in the push-pull detected pre-formatted signals. Moreover, it becomes possible to enlarge the two-dimensional margin of the error rate with respect to spherical aberration and defocusing.

According to the present invention, as described above, in which pre-formatted signals are detected by push-pull detection with an interval, not employing the center area of the light spot of the reflected light beam from the recording track, it becomes possible to suppress variations in the amplitude or phase in the push-pull detected pre-formatted signals, while it becomes possible to enlarge the two-dimensional margin of the error rate with respect to spherical aberration and defocusing.

BRIEF DESCRIPTION OF THE DRAWINGS

FIG. 13 depicts a graph showing measured results of the two-dimensional margin of the error rate with respect to the defocusing and spherical aberration for the interval ratio of 42.5%.

FIG. 14 depicts a graph showing measured results of the two-dimensional margin of the error rate with respect to the defocusing and spherical aberration for the interval ratio of 0%.

FIG. 15 depicts a graph showing measured results of the two-dimensional margin of the error rate with respect to the defocusing and spherical aberration for the interval ratio of 22.5%, in which wobble signal characteristics have been deteriorated.

FIG. 16 depicts a graph showing measured results of the two-dimensional margin of the error rate with respect to the defocusing and spherical aberration for the interval ratio of 32.5%, in which wobble signal characteristics have been deteriorated.

DESCRIPTION OF PREFERRED EMBODIMENTS

Figure 1:
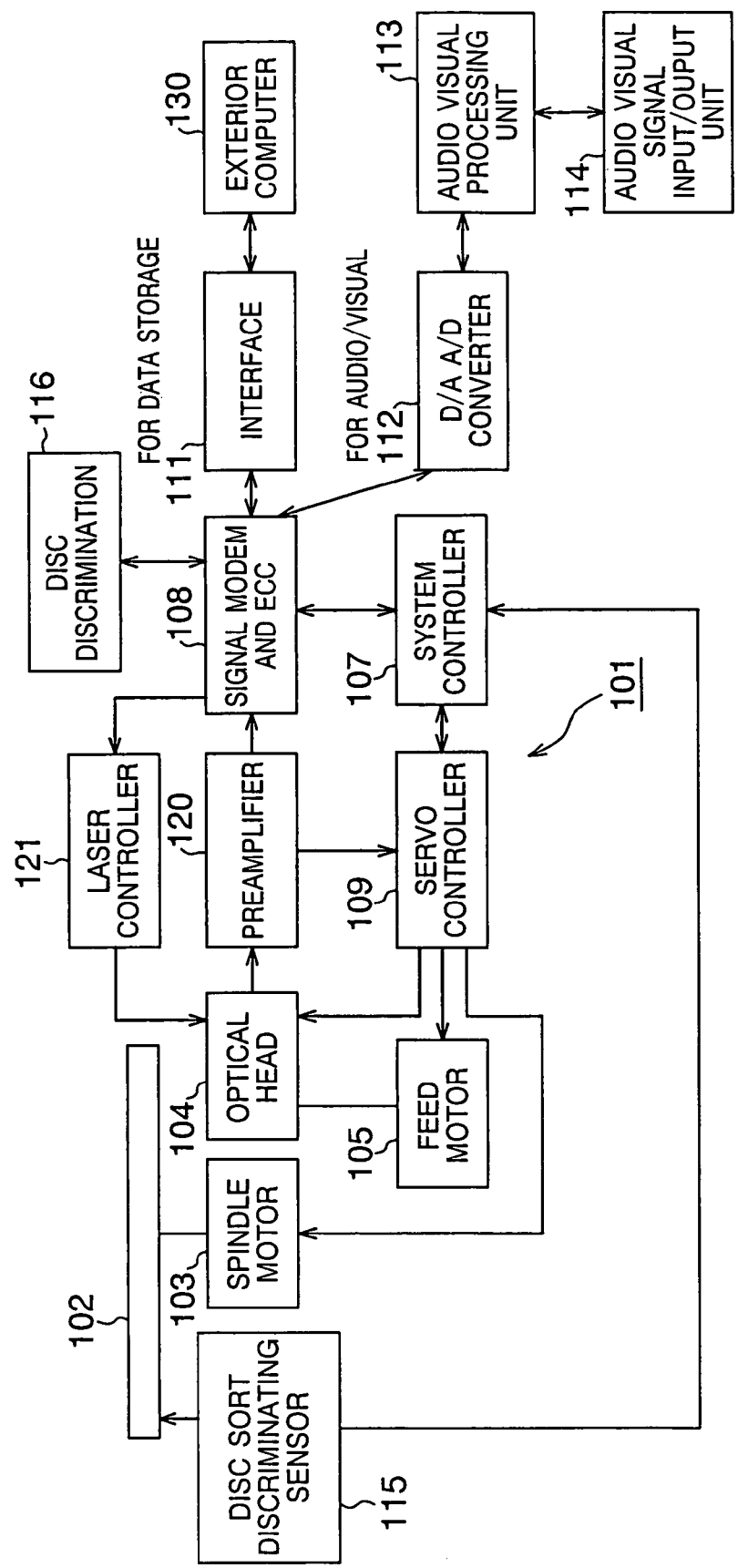
FIG. 1 is a block diagram showing the structure of a recording and/or reproducing apparatus.

Referring to the drawings, an optical head and a recording and/or reproducing apparatus, according to the present invention, will be explained in detail.

A recording and/or reproducing apparatus 101, according to the present invention, shown in FIG. 1, is a recording and/or reproducing apparatus for an optical recording medium, adapted for recording and/or reproducing information signals for an optical disc 102 as the optical recording medium.

Specifically, this recording and/or reproducing apparatus for an optical recording medium 101 includes a spindle motor 103, as a driving means for rotationally driving the optical disc 102, an optical head 104 according to the present invention, and a feed motor 105, as a driving means for the optical head 104.

The spindle motor 103 is driven in a controlled manner by a system controller 107, also serving as a disc sort discriminating means, and by a servo control circuit 109, so as to be run in rotation at a predetermined rpm.

The optical disc 102 is an optical disc of any one of a large variety of recording systems, which is a recording and/or reproducing disc employing optical modulation recording, such as magneto-optical recording, a phase change recording or a dyestuff recording, for example, a CD-R/RW, DVD-RAM, DVD-R/RW or DVD+RW, or any one of a large variety of magneto-optical recording mediums.

In a disc substrate of each of the above discs, there is formed a wobbling groove(s) meandering (wobbling) at a preset period in a helical or concentric pattern, about the center opening of the disc as center. A recording track(s) is formed in registry with the groove(s). The areas defined between the neighboring grooves neighboring turns of the groove are termed lands, on which the recording track(s) is formed in a certain type of the disc.

By forming the wobbling groove in the disc substrate, recording clocks, the address information or the information on the optical recording medium may be appended to the wobbled recording track(s) per se. That is, with the present optical disc, the above information is recorded on the recording track(s) as wobble signals modulated by wobbling. For example, in the present optical disc 102, the address timing information of extremely high precision is recorded as the wobble signals by overlaying the address information by the MSK modulated wobble signals on mono-tonal clock signals obtained by high frequency wobbling.

The optical disc 102 to be used may be selected from two or more sorts of the optical discs having different optimum recording and/or reproducing optical power on the recording layer. The optical disc 102 to be used may also be an optical disc, the recording layer of which has been divided into two or more recording layers different in the optimum recording and/or reproducing optical power, or an optical disc including plural recording layers stacked together via a transparent substrate(s).

The difference in the optimum recording and/or reproducing optical power on the recording layer may also be the difference in the rotational speed of the optical disc (linear speed of the optical disc relative to the optical head 104), that is, a n-tuple speed disc as compared to the so-called standard speed disc, in addition to the difference in the recording system itself in the optical disc.

As this optical disc 102, optical discs having different optimum recording and/or reproducing optical power, or multi-layered optical discs having two or more of the same recording layers, may be used. In this case, the difference in the optimum recording and/or reproducing optical power for the respective recording layers is produced in dependency upon the difference in the designing manner of the multi-layered optical disc.

The wavelengths of the recording and/or reproducing light of these optical discs may, for example, be 405 nm or on the order of 400 nm to 780 nm.

The optical head 104 radiates a light beam on a recording track of the optical disc 102 to detect the light beam reflected back from the recording track. Based on the light beam, reflected back from the recording track of the optical disc 102, the optical head 104 detects various light beams, as later explained, to send signals corresponding to the respective light beams to a preamplifier 120.

An output of this preamplifier 120 is sent to a signal modulation/demodulation unit/ECC block 108, which executes signal modulation/demodulation and appendage of the ECC (error correction code). The optical head 104 radiates light to the recording layer of the rotating optical disc 102 in accordance with the command of the signal modulation/demodulation unit/ECC block 108. By this light radiation, signals may be recorded to or reproduced from the optical disc 102.

The preamplifier 120 is designed to generate focusing error signals, tracking error signal, RF signals, wobble signals, and so forth, as later explained, based on signals associated with the respective light beams. In keeping with the sorts of the optical recording mediums, as the mediums for recording or reproduction, preset processing operations for these signals, such as demodulation and error correction processing, are carried out by e.g. the servo control circuit 109 and by the signal modulation/demodulation unit/ECC block 108.

In case the optical disc 102 is designed for e.g. storage of computer data, the demodulated recording signals are sent out through an interface 111 to e.g. an external computer 130. This external computer 130 is designed to receive signals, recorded on the optical disc 102, as replay signals.

In case the optical disc 102 is designed for so-called "audio visual", the recording signals are digital/analog converted by a D/A converting unit of a D/A A/D converter 112 and sent to an audio visual processing unit 113. The signals supplied to this audio visual processing unit 113 are subjected in this audio visual processing unit 113 to audio video signal processing and thence transmitted through an audio visual signal input/output unit 114 to an exterior imaging/projecting unit.

The optical head 104 is moved by a feed motor 105 to a predetermined recording track on the optical disc 102. The control of the spindle motor 103 and the feed motor 105 and the control of the driving in the focusing direction and in the tracking direction of a biaxial actuator holding an objective lens operating as a light condensing means in the optical head 104 are exercised by the servo control circuit 109.

The servo control circuit 109 actuates an optical coupling efficiency varying device, arranged within the optical head 104, and controls the optical coupling efficiency in the optical head 104, that is, the ratio of the volume of light condensed on the optical disc 102 to the total volume of the light beam radiated from a laser light source, such as a semiconductor laser device, as a light source, so that the optical coupling efficiency will differ depending on whether the mode is the recording mode or the reproducing mode, and/or on the sort of the optical disc 102.

Moreover, a laser controller 121 controls the laser light source in the optical head 104. In particular, in the present embodiment, the laser controller operates for controlling the output power of the laser light source so that the output power will differ depending on whether the mode is the recording mode or the reproducing mode, and/or on the sort of the optical disc 102.

In case the optical disc 102 used is selected from two or more optical discs each having a different value of the optimum recording and/or reproducing optical power on the recording layer, a disc sort discriminating sensor 115 discriminates the sort of the optical disc 102 loaded. The two or more optical discs so selected may differ in the optimum recording and/or reproducing optical power due to the difference in the recording system or in the relative linear velocity with respect to the light beam. The two or more optical discs so selected may also differ in the optimum recording and/or reproducing optical power depending on which one of recording areas obtained on dividing the recording layer of the disc is used or on which one of the recording layers stacked to form the disc is used. There are a wide variety of systems of the optical discs 102 employing optical modulation recording, and a variety of magneto-optical recording mediums, as described above. These optical discs or recording mediums may differ in the optimum recording and/or reproducing optical power on the recording layer. The disc sort discriminating sensor 115 detects the difference in the surface reflectance or other difference in shape or outer profile of the optical disc 102.

The system controller 107 discriminates the sort of the optical disc 102 based on the results of detection sent from the disc sort discriminating sensor 115.

As for the technique for discriminating the sort of the optical recording medium, it may be contemplated, for an optical recording medium of the type accommodated in a cartridge, to provide a detection opening in this cartridge. It may also be contemplated to detect the "disc species" or the "recommended recording power and the recommended reproducing power", based on for example the table-of-contents (TOC) information recorded in pre-mastered pits or in a groove(s) on the innermost rim, and to set the recording and reproducing optical power suited for the recording and the reproduction for the optical recording medium.

The servo control circuit 109, serving as an optical coupling efficiency control means, is controlled by the system controller 107 to control the optical coupling efficiency in the optical head 104, depending on the sort of the loaded optical disc 102, in keeping with the results of discrimination by the disc sort discriminating sensor 115.

In case an optical disc, the recording layer of which is divided into at least two recording areas having different values of the optimum recording and/or reproducing power, is used as the optical disc 102, the recording area desired to be recorded and/or reproduced is detected by a recording area discriminating means. When the recording area of the optical disc is divided into plural concentric recording areas depending on the distance from the center of the optical disc 102, the servo control circuit 109 may be used as the recording area discriminating means. The servo control circuit 109 may detect, for example, the relative positions between the optical head 104 and the optical disc 102 to discriminate the recording area, desired to be recorded and/or reproduced. The servo control circuit may detect the relative position based on an address recorded on the disc 102. The servo control circuit 109 controls the optical coupling efficiency in the optical head 104 based on the results of the discrimination of the recording area desired to be recorded and/or reproduced.

In case the optical disc 102 is a multi-layered optical disc having at least two recording layers with different values of the optimum recording and/or reproducing power, the recording area desired to be recorded and/or reproduced is detected by a recording layer discriminating means. As the recording area discriminating means, the servo control circuit 109 may be used. The servo control circuit 109 may detect the relative position between the optical head 104 and the optical disc 102 to detect the recording layer desired to be recorded and/or reproduced. The servo control circuit 109 controls the optical coupling efficiency in the optical head 104 depending on the results of the discrimination of the recording layer desired to be recorded and/or reproduced.

It is noted that the information on the sort, recording area or the recording layer of the optical disc may also be discriminated by reading out the archival information, such as the so-called TOC information, recorded on the respective optical discs.

The optical head 104 according to the present invention writes and/or reads out information signals, as the optical head is fed by the feed motor 105 along the radius of the optical disc 102, which is run in rotation by the aforementioned spindle motor 103.

Figure 2:
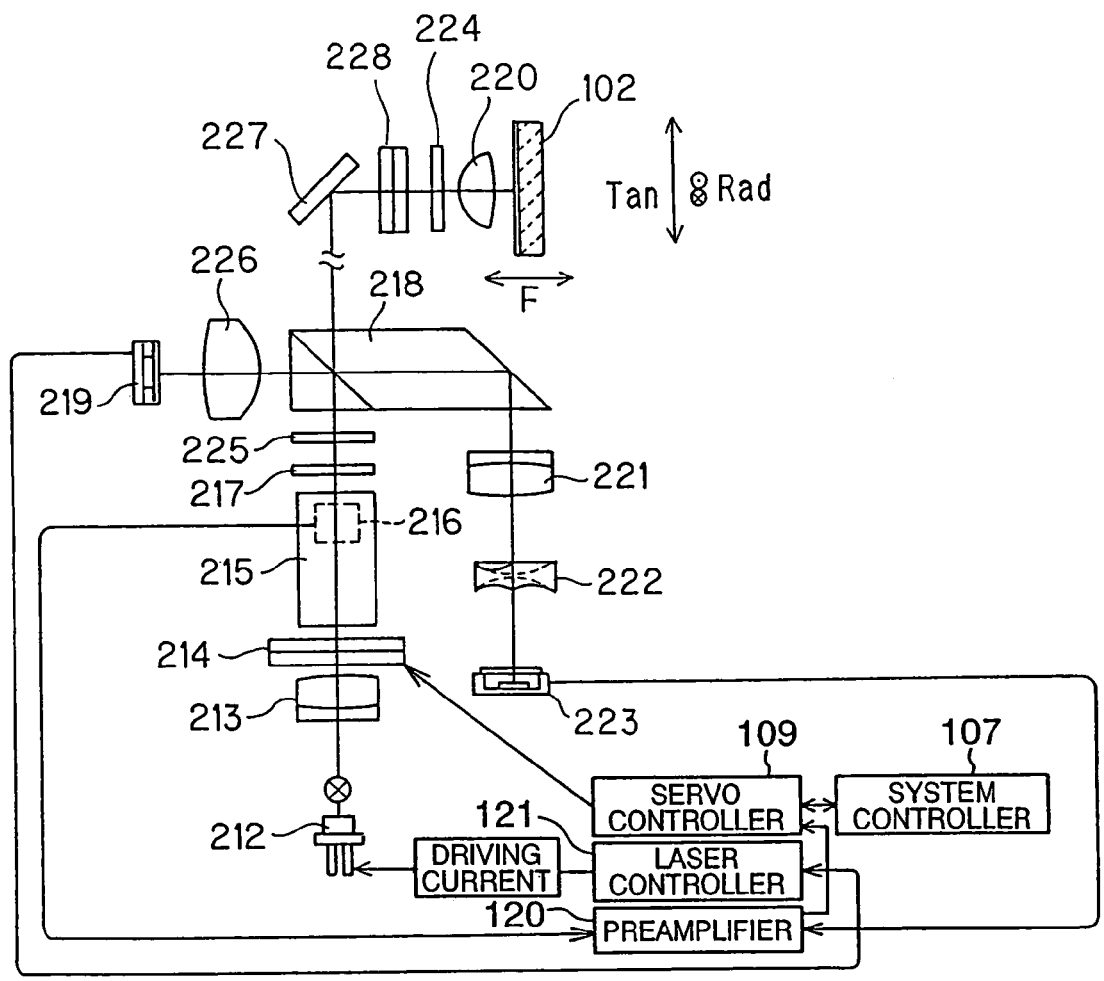
FIG. 2 is a schematic view showing the structure of the optical head.
Figure 3:
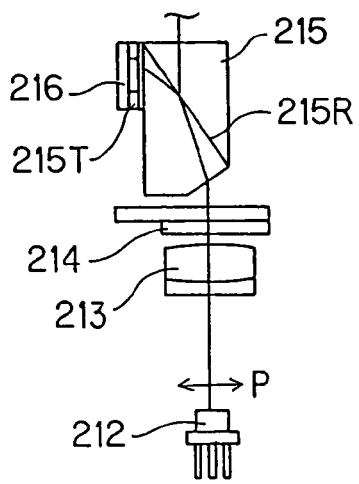
FIG. 3 is a side view showing the structure of an optical coupling efficiency varying means of the optical head.

Specifically, the optical head 104 includes a semiconductor laser device 212, as a light source, a collimator lens 213, and a liquid crystal device 214, as an optical coupling efficiency varying device, forming an optical coupling efficiency varying means, and an anamorphic prism 215, as shown in FIG. 2, and an anamorphic prism 215, including a polarizing light beam splitting film surface 215R, as shown in FIG. 3.

The optical head 104 includes a phase plate 217, for example, a half (½) wave plate, a refractive optical device 225 for diffracting the incident light beam for separating the light beam into three light beams, a beam splitter 218, operating as a light separating means, and a detection device for FAPC (front auto power control) 219, as a photodetector on which is incident a light beam reflected by the beam splitter 218 through a light-condensing lens 226 and which operates for detecting the power of light emission of the semiconductor laser device 212.

The optical head 104 also includes a mirror 227 for reflecting the light beam transmitted through the beam splitter 218 to bend the optical path thereof, an aberration correcting device 228, a quarter (¼) wave plate 224, and an objective lens 220, operating as a light condensing means, and condenses the light beam from these to a signal recording layer of the optical disc 102. The numerical aperture (NA) of the objective lens 220 is e.g. 0.85.

The optical head 104 also includes, as an optical system for receiving the light beam condensed on a recording track and reflected back therefrom, a detection lens 221, a multi-lens 222 and an optical detection device 223, operating as an optical detection means. On this optical detection means is sequentially incident the reflected light beam returned through the objective lens 220, quarter (¼) wave plate 224, aberration correcting device 228 and the mirror 227 to the beam splitter 218 and reflected by this beam splitter 218.

The aforementioned optical components are separately mounted within an optical block, not shown, to form the optical head 104.

In this optical head 104, the diffused light beam of the linear polarized light, radiated from the semiconductor laser device 212, is incident on the collimator lens 213 and thereby formed into a collimated light beam which is then incident on the liquid crystal device 214. The light beam passed through this liquid crystal device 214 is sequentially incident on the anamorphic prism 215, phase plate 217, refractive optical device 225 and on the beam splitter 218.

The anamorphic prism 215 shapes the cross-sectional shape of the light beam, radiated from the semiconductor laser device 212, from the elliptical shape to substantially the circular shape. That is, the light beam, radiated from the semiconductor laser device 212, is the linear polarized light and has an elliptical cross-section having the polarized state indicated by arrow P in FIG. 3 as the short radius direction. This light beam falls on the incident surface of the anamorphic prism 215, inclined relative to the short radius direction of the elliptical cross-sectional shape, so as to be enlarged in the beam diameter thereof in this short radius direction, and is thereby shaped to a substantially circular light beam.

The optical coupling efficiency varying means is made up by a liquid crystal device 214, on which falls the light beam from the semiconductor laser device 212, and which causes the polarized state of the light beam to be changed, and the polarizing light beam splitting film surface 215R, on which falls the light beam passed through the liquid crystal device 214. The optical coupling efficiency varying means is provided between the semiconductor laser device 212 and the beam splitter 218.

The liquid crystal device 214 of the optical coupling efficiency varying means causes the polarized state of the light beam to be changed to vary the optical coupling efficiency which is the ratio of the volume of light condensed on the optical disc 102 to the total volume of the light beam radiated from the semiconductor laser device 212. The liquid crystal device 214 causes the polarized state of the transmitted light to be changed based on the voltage applied. The voltage applied to the liquid crystal device is controlled by the servo control circuit 109. The light beam transmitted through the liquid crystal device 214 is incident on the anamorphic prism 215 as the state of light polarization thereof has been changed.

The polarizing light beam splitting film surface 215R of the anamorphic prism 215 is a planar surface tilted at a preset angle relative to the optical axis of the incident light beam, as shown in FIG. 3, and is adapted for transmitting approximately 100% of the P-polarized light and for reflecting approximately 100% of the S-polarized light. Thus, in case the light beam transmitted through the liquid crystal device 214 is substantially similar to the incident polarized light (linear polarized light) (open state), the light beam in a volume of approximately 100% is transmitted through the polarizing light beam splitting film surface 215R of the anamorphic prism 215.

If conversely the light beam transmitted through the liquid crystal device 214 is in such a state that the direction and/or the state of light polarization thereof has been changed with respect to that of the incident polarized light, as when the light beam has become the elliptically polarized light (closed state), the light beam in a light volume of a preset ratio is transmitted through the polarizing light beam splitting film surface 215R of the anamorphic prism 215, while the remaining light beam is reflected by the polarizing light beam splitting film surface 215R.

In the present optical head 104, the light beam, radiated from the semiconductor laser device 212, falls on the optical disc 102, in such a manner that the optical coupling efficiency is changed over as described above in dependency upon, for example, the difference in the sort, recording area, recording layer, recording speed or in the recording/reproducing mode, so that the laser noise in the radiating power of the laser light source is sufficiently small during reproduction as a disc surface power necessary for recording is maintained during recording. That is, in the present optical head 104, the dynamic range necessary for the semiconductor laser device 212 may be diminished.

The light beam, reflected on the polarizing light beam splitting film surface 215R of the anamorphic prism 215, is received via a total reflection preventative device (light radiating unit) 215T by a light splitting quantity monitoring photodetector device 216, operating as an optical coupling efficiency detection means.

Figure 4:
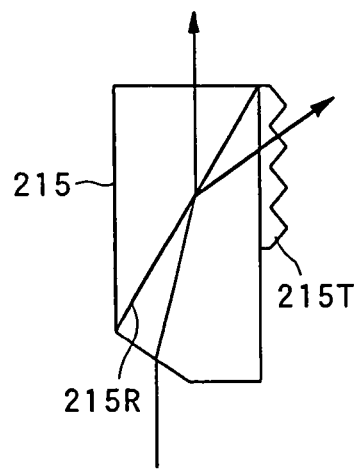
FIG. 4 is a side view showing the structure of an anamorphic prism forming the optical coupling efficiency varying means.

The total reflection preventative device 215T is adapted to prevent the light beam, reflected on the polarizing light beam splitting film surface 215R, from undergoing total reflection on the inner surface of the anamorphic prism 215. To this end, the total reflection preventative device 215T is formed to have a stepped shape having plural facets extending substantially at right angles to the light beam, as shown in FIG. 4, and is arranged in optically tight contact with the anamorphic prism 215.

Figure 5:
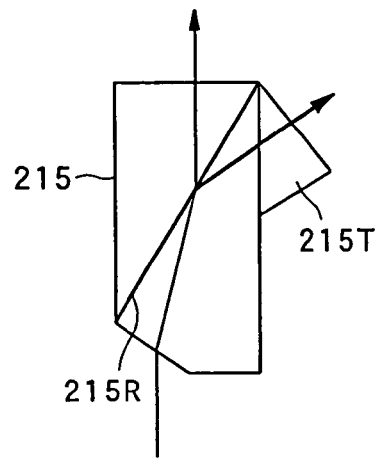
FIG. 5 is a side view showing the structure of a modification of the anamorphic prism.
Figure 6:
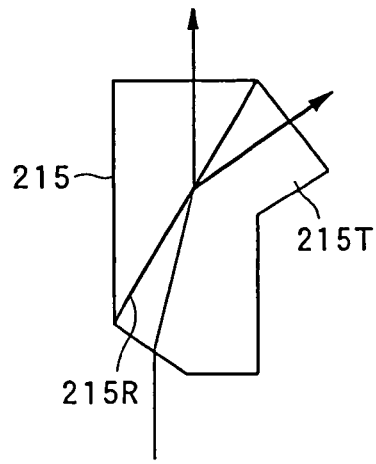
FIG. 6 is a side view showing the structure of a further modification of the anamorphic prism.

Meanwhile, the total reflection preventative device 215T may be formed as a triangular prism, having a facet extending substantially at right angles to the light beam, as shown in FIG. 5. Alternatively, the triangular prism of the total reflection preventative device may also be arranged in tight optical contact with the anamorphic prism 215, or may be formed as one with the anamorphic prism 215, as shown in FIG. 6.

An output of the light splitting quantity monitoring photodetector device 216 is sent to the preamplifier 120, as shown in FIG. 2. The output of the light splitting quantity monitoring photodetector device 216 corresponds to the product of the light emission output of the semiconductor laser device 212 and the light splitting factor on the polarizing light beam splitting film surface 215R of the anamorphic prism 215, and substantially corresponds to the optical coupling efficiency in the optical head 104. Meanwhile, in the present optical head 104, the volume of the light incident on the light splitting quantity monitoring photodetector device 216 is decreased and increased when the optical coupling efficiency is high and low, respectively. The volume of light incident on the light splitting quantity monitoring photodetector device 216 is proportional to the product of "100%—(factor of transmission through the optical coupling efficiency varying means (%))" with the "laser radiation power".

The refractive optical device 225 splits the incident light beam into a main light beam (zero order light) and a pair of subsidiary light beams (±one order light). The main light beam is a light beam for forming on the recording track a main light spot for recording and/or reproducing information signals for a signal recording layer of the optical disc 102. The paired subsidiary light beams form a pair of subsidiary light spots on the locations on the recording track of the optical disc 102 separated from the main light spot. Meanwhile, a holographic optical component, which affords e.g. the aberration, may also be used as the refractive optical device 225.

The light beams, incident through the anamorphic prism 215, phase plate 217 and the refractive optical device 225 on the beam splitter 218, are substantially P-polarized with respect to the planar reflective surface of the beam splitter 218 inclined relative to the optical axis of the incident light. Meanwhile, the phase plate 217 is rotationally adjusted about the optical axis in order to set up the P-polarized state of the incident light beam with respect to the reflective surface of the beam splitter 218.

This beam splitter 218 splits the light beam, radiated from the semiconductor laser device 212, into light transmitted through this beam splitter 218 to proceed towards the recording layer of the optical disc 102, and into light incident on the detection device for FAPC 219 used for monitoring the light volume of the light beam proceeding towards the recording layer, by a preset splitting factor. For example, a certain proportion not higher than 95% of the light beam is adapted to proceed towards the recording layer of the optical disc 102. The light transmitted through the beam splitter 218 is then transmitted via mirror 227 through the aberration correcting device 228 and through the quarter wave plate 224, in this order, and is turned by this quarter wave plate 224 into circular polarized light, which then is incident on the objective lens 220.

The aberration correcting device 228 is constituted by a liquid crystal device. That is, the aberration correcting device 228 includes a liquid crystal cell in which a pair of glass substrates are sealed together by a sealant mainly composed of, for example, an epoxy resin, as stated in for example the Patent Publication 1 (Japanese Laying-Open Patent Publication 2002-56559). The sealant includes e.g. a spacer formed of glass and an electrically conductive spacer formed by coating e.g. gold on the surface of a resin member.

On the inner surface of one of the glass substrates are formed an electrode, an insulating film, formed e.g. of silica, and an oriented film, in this order, looking from the inner surface. On the inner surface of the other glass substrate are also formed an electrode, an insulating film, formed e.g. of silica, and an oriented film, in this order, looking from the inner surface. In the inside of the liquid crystal cell is charged a liquid crystal. The liquid crystal molecules, forming this liquid crystal, are in a homogeneously oriented state in which the molecules are oriented unidirectionally. An anti-reflection film may be deposited on the outer surface of the liquid crystal cell.

The material of the oriented film is preferably such a one in which the pre-tilt angle of the liquid crystal molecules is 2° to 10° or in which a polyimide film is rubbed in a predetermined direction or a silica film is vapor-deposited obliquely. The difference between the refractive indices of the ordinary light and the extraordinary light of the liquid crystal is preferably increased, while the separation (thickness) between the liquid crystal cells is preferably reduced to enhance response characteristics. However, the smaller the separation between the liquid crystal cells, the more difficult becomes the manufacture of the liquid crystal cell. Consequently, the difference between the refractive index of the ordinary light and that of the extraordinary light of the liquid crystal is preferably on the order of 0.1 to 0.2, with the interval between the liquid crystal cells being on the order of 2 to 5 µm.

In this aberration correcting device 228, a plural number of feeder units for applying different voltages are formed at different positions in at least one surface of each electrode. These feeder units are respectively independently connected via jumper wires to the servo control circuit 109 with the interposition of electrically conductive spacers coated e.g. with gold.

In this aberration correcting device 228, the voltages applied to the plural feeder units of the respective electrodes may be appropriately selected and adjusted to correct the phase state of the light beam transmitted through the aberration correcting device 228 to set up a phase state corresponding to the spherical aberration.

Meanwhile, in this aberration correcting device 228, in which the paired substrates are both transparent, and the light beam is passed through this aberration correcting device 228, the electrode material is preferably of a high transmittance, such that a transparent electrically conductive film, such as an ITO film or a zinc oxide film, is desirably used.

The light beam incident on the objective lens 220 is condensed by this objective lens 220 so as to be illuminated on a recording track of the optical disc 102. This objective lens 220 is driven by a biaxial actuator, not shown, along the focusing direction indicated by arrow F in FIG. 2 and along the tracking direction indicated by arrow Rad in FIG. 2 (radial direction).

The incident light beam, reflected by the reflective surface of the beam splitter 218 in a preset proportion of, for example, not less than 5%, is incident on the detection device for FAPC 219. An output of the detection device for FAPC 219 is sent to the laser controller 121 where the automatic power control operation is executed. That is, the laser controller 121 controls the driving current to be supplied to the semiconductor laser device 212, so that the output of the detection device for FAPC 219 will be of a predetermined value, in order to control the light emission output of the semiconductor laser device 212. By this control, the output of the light beam illuminated on the recording layer of the optical disc 102 (power on the disc surface) is rendered constant. The laser controller 121 may be provided on the outside of or loaded on the optical head 104.

Meanwhile, the output value of the illuminated light beam, which is of a preset value on the recording layer of the optical disc 102, differs depending on whether the operating mode is the recording mode or the reproducing mode, and also on e.g. the sort of the optical disc. It is noted that the output value of the illuminated light beam is pulsed light emission in case the disc is of the optical modulation recording system.

The light beam, reflected by the recording layer of the optical disc 102, is passed through the objective lens 220 and transmitted through the quarter wave plate 224 so as to be turned into a light beam of linear polarized light having the state of light polarization perpendicular to that of the light beam of the ongoing path. This reflected light beam is returned to the beam splitter 218 via the aberration correcting device 228 and the mirror 227.

The reflected light beam at this time is in the state of substantially S-polarized light relative to the reflective surface of the beam splitter 218. Substantially the total quantity of the light beam is reflected by this reflective surface and separated from the optical path from the semiconductor laser device 212. The reflected light beam, separated from the optical path from the semiconductor laser device 212, is radiated from the beam splitter 218 and turned into converging light by the detection lens 221. The multi-lens 222 imparts astigmatism to the converging light in order to obtain focusing error signals by the astigmatic method. The resulting light is incident on and received by the optical detection device 223. The multi-lens 222 has one concave surface and the other cylindrical surface.

Figure 7:
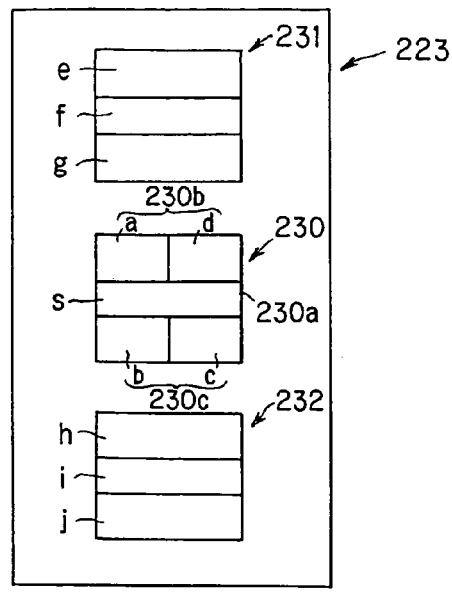
FIG. 7 is a plan view showing the structure of an optical detection device of the optical head.

Referring to FIG. 7, the optical detection device 223 includes a main light receiving device 230, a first subsidiary light receiving device 231 and a second subsidiary light receiving device 232. It is noted that, of the reflected light beam from the recording track, the main reflected light beam from the main light spot, the first subsidiary reflected light beam from the first subsidiary light spot and the second subsidiary reflected light beam from the second subsidiary light spot are received by the light receiving device 230, the first subsidiary light receiving device 231 and the second subsidiary light receiving device 232, respectively.

Of these light receiving devices, the main light receiving device 230 has a light receiving pattern comprising an interval area 230a in register with a center portion of the main light spot and a pair of light receiving sections 230b, 230c separated from each other by this interval area 230a.

Specifically, the interval area 230a comprises a light receiving section s which, for suppressing variations in the amplitude and the phase in the wobble signal, detected by the push-pull method as later explained, receives the mid area of the light spot passed through the center of the main light spot and which extends along the direction of the recording track.

The paired light receiving sections 230b, 230c are the first light receiving section 230b and the second light receiving section 230c for respectively receiving one light spot area and the other light spot area on both sides of a center light spot area of the main light spot, for detecting the push-pull signal by the so-called "push-pull method". For detecting focusing error signals by the so-called "astigmatic method", the first and second light receiving sections 230b, 230c include four light receiving sections a to d, arrayed radially from a center portion. Of these four light receiving sections, the light receiving sections a, c and the light receiving sections b, d are arrayed diagonally via the center portion of the main light receiving device 230. From these four light receiving sections a to d, distinct photodetector signals a to d are output, respectively. The sum of the photodetector signals a, b, c, d and s (a+b+c+d+s) is used as a reference for the AGC (automatic gain (amplitude) control) against changes in reflectance of the recording medium and a pull-in signal for focusing servo pull-in. Additionally, the AC component of the sum signal serves as so-called RF signals read out from the optical disc 102.

On the other hand, the light receiving surface of the first subsidiary light receiving device 231 has a pattern consisting of three light receiving sections e to g, obtained on dividing the light receiving surface into three sections by partitioning lines extending parallel to the recording track, for detecting tracking error signals by the so-called "differential push-pull method" along with the main light receiving device 230. From these three light receiving sections e to g, distinct photodetector signals e to g are output. Similarly, the light receiving surface of the second subsidiary light receiving device 232 has a pattern consisting of three light receiving sections h to j, obtained on dividing the light receiving surface into three sections by partitioning lines extending parallel to the recording track. From these three light receiving sections h to j, distinct photodetector signals h to j are output.

With the present optical head 104, RF signals (RF), pull-in signals (PI), focusing error signals (FCS), push-pull signals for the main spot (MPP), serving as wobble signals, push-pull signals for the first subsidiary spot (SPP 1), push-pull signals for the second subsidiary spot (SPP 2) and tracking error signals (TRK), as defined below, are generated, based on the photodetector signals output from the photodetector 223 from the input light from the multi-lens.

RF (RF signals for the main spot)=modulated component of (a+b+c+d+s)
PI (pull-in signals: focusing pull-in signals: sum signal for the main spot)=a+b+c+d+s
SPI 1 (sum signal for the first subsidiary signal)=e+f+g
SPI 2 (sum signal for the second subsidiary signal)=h+i+j
PCS (focusing error signals (astigmatic signal for the main spot))=(a+c)−(b+d)
MPP (wobble signals: push-pull signals for the main spot)={(a+d)−(b+c)}
SPP 1 (push-pull signal for the first subsidiary spot)=e−g
SPP 2 (push-pull signal for the second subsidiary spot)=h−j
TRK (tracking error signals)=MPP−K·(SPP 1+SPP 2) where K is a proportionality constant.

Moreover, each of the servo signals may be subjected to AGC (automatic gain (amplitude) control) for stabilizing the aforementioned respective signals against changes in the reflectance of the recording layer of the optical disc 102 or against changes in the light volume during pulse recording. In this case, the aforementioned respective signals may be represented as follows:
FCS (AGC) (focusing error signals processed with AGC)=FCS/PI
TRK (AGC) (tracking error signals processed with AGC)=MPP/PI−K·(SPP 1/SPI 1+SPP 2/SPI 2).

Meanwhile, in the optical head 104, embodying the present invention, the first and second light receiving sections 230b, 230c of the main light receiving device 230 receive the light of the one and the other of the spot areas on both sides of the center area of the main light spot, respectively. The main light receiving device 230 then finds the difference {(a+d)−(b+c)} between the sum (a+d) of the photodetector signals from the first light receiving section 230b and the sum (b+c) of the photodetector signals from the second light receiving section 230c to detect the wobble signal by push-pull detection.

The degree of interference of the wobbling of neighboring recording tracks may readily be seen as changes in the wobbling amplitude due to beat. That is, when the wobbling detection signal is expressed as A(Tp)+B(2Tp)+ . . . , the signal component A(Tp) is the intrinsic wobble signal component generated in portions A in FIG. 24B, that is, in two spot areas on both sides of the center area of the light spot, by the diffracted light deviated by $\lambda/(Tp\cdot NA)$, and represents a signal component vulnerable to perturbations in the orientation of (Def, SA)=(+, +), (−, −) shown in FIG. 25. On the other hand, the signal components B(2Tp) is the pseudo signal component mainly generated in the portions B and C in FIG. 24B, that is, in a center area of the light spot, by the diffracted light deviated by $\lambda/(2Tp\cdot NA)$, and represents a signal component extremely strong against perturbations in the orientation of (Def, SA)=(+, +), (−, −), to which the intrinsic wobble signal component is vulnerable.

Thus, in two-segment push-pull detection by a routine photodetector having the light receiving surface divided into two sections along the recording track, there persist the portions B and C, which represent signal components extremely strong against the perturbations in the orientation of (Def, SA)=(+, +), (−, −), so that it becomes difficult to detect the intrinsic wobble signals in this orientation. If simply the signal amplitude is lowered, the variations in the amplitude may be improved by AGC. However, in this case, the signal components B and C interfere with the AGC effect for the portions A. Thus, in case defocusing occurs, the majority of the signal components become the signal component B, thus causing significant waveform distortion.

Conversely, with the push-pull detection with an interval, in which the center area of the light spot is eliminated, the intrinsic wobble signal may be of a high quality as a result of elimination of the signal component B. Moreover, the AGC effect against the lowering of the amplitude for the portions A is effective, such that changes in the waveform may be reduced against defocusing.

Thus, with the optical head 104 according to the present invention, in which the detection of the wobble signal is not by two-segment push-pull detection but by push-pull detection with an interval, it is possible to suppress variations in the amplitude or in the phase of the wobble signal. Additionally, with this optical head 104, attempts may be made to enhance the two-dimensional margin for the error rate of the preformatted signals, such as address signals or the disc information, with respect to the spherical aberration or defocusing.

For modulation of the address signals, such a modulation system is used in which the presence/absence of the MSK modulation marks under e.g. the following conditions corresponds to 0 or 1, respectively.

mono-tonal wobble signals: $\cos(\omega t)$

Figure 8:
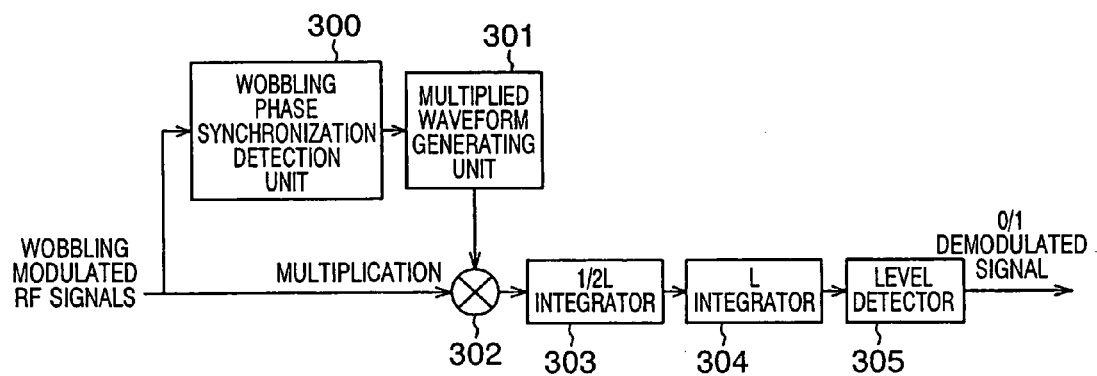
FIG. 8 is a block diagram showing the structure of a demodulation circuit of MSK modulated wobble signals.

MSK modulated wobble signals: $\cos(1.5\omega t)$, $-\cos(\omega t)$, $-\cos(1.5\omega t)$ In demodulating the wobble signals, a wobble phase synchronization detection unit 300 synchronously detects wobble modulated RF signals, obtained on MSK modulation, as in a demodulating circuit shown in FIG. 8. A multiplied waveform generating unit 301 generates a multiplied waveform, synchronized with the wobble modulated RF signals, usually a sine wave or a rectangular wave of a wobble period. A multiplier 302 multiplies the multiplied waveform with the wobble modulated RF signals. A 1/2L integrator 303 and an L integrator 304 integrate the results of the multiplication of the multiplied waveform with the wobble modulated RF signals over a period equal to a constant number multiple of one wobbling period L. A level detector 305 detects the signal level, based on the result of the integration, in such a manner that, if the result of the integration is positive or negative with zero as a threshold value, the decoded bit is "0" or "1", respectively. This enables demodulation of the ADIP (address in pre-groove) in which the address information is prerecorded as the wobble signal.

Figure 26:
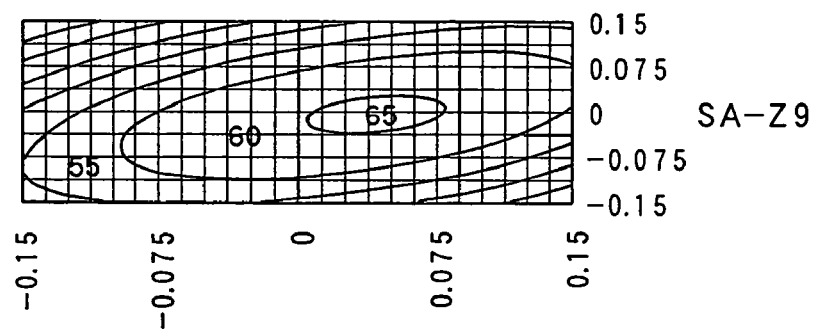
FIG. 26 depicts a graph of two-dimensional distribution showing changes in the wobble amplitude in which the defocusing and the spherical aberration for the out-of-phase state are used as a reference.
Figure 27:
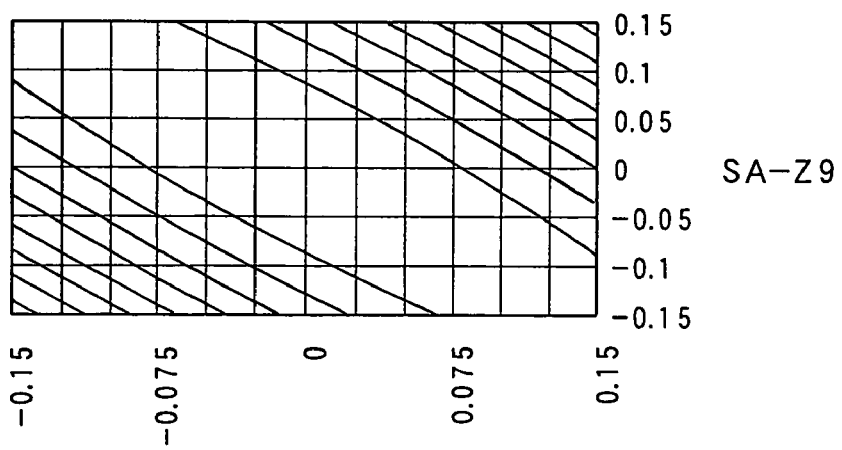
FIG. 27 depicts a graph showing changes in the amplitude of the push-pull signals in which the defocusing and the spherical aberration are used as a reference.

The amplitude changes in the wobble signals by push-pull detection with an interval were calculated by computer simulation, in connection with the beat with which the level of the improvement in the magnitude of the interference between neighboring wobbles may be seen in the simplest manner, as in the above-described case of the usual two-segment push-pull detection shown in FIG. 26. The calculated results are shown in FIG. 9.

Figure 9:
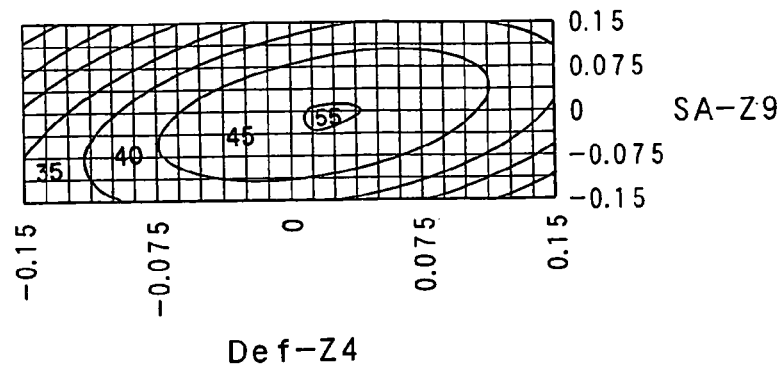
FIG. 9 depicts a graph of two-dimensional distribution showing changes in the wobble amplitude in which the defocusing and spherical aberration in the case of push-pull detection with an interval (for the out-of-phase state) are used as a reference.

The graph of FIG. 9 depicts the two-dimensional distribution showing changes (for the out-of-phase case) in the wobble amplitude referenced to Z4 (defocusing) and Z9 (spherical aberration) in the Fringe-Zernike aberration polynominal. In the present computer simulation, as in the above case, the calculations were conducted with the wavelength $\lambda$ of 405 nm, the numerical aperture NA of the objective lens equal to 0.85, the track pitch Tp of the optical recording medium of 0.32 and with the wobbling amplitude of ±10 nm. The width of the interval at a center portion of the spot, not used for wobble signal detection, was set to 32.5%. Meanwhile, the optimization of the width of the interval will be explained subsequently along with the results of the experimentation.

Figure 24A:
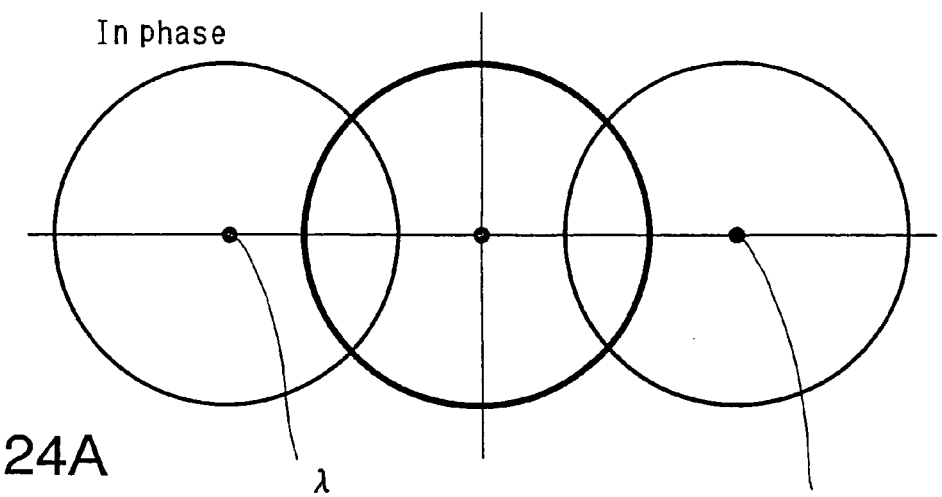
FIGS. 24A and 24B are schematic views for illustrating light beams reflected and diffracted by two neighboring wobbling recording tracks, in which wobbling of the two neighboring tracks is in phase with each other and the wobbling of the two neighboring tracks is out of phase with each other, respectively.
Figure 24B:
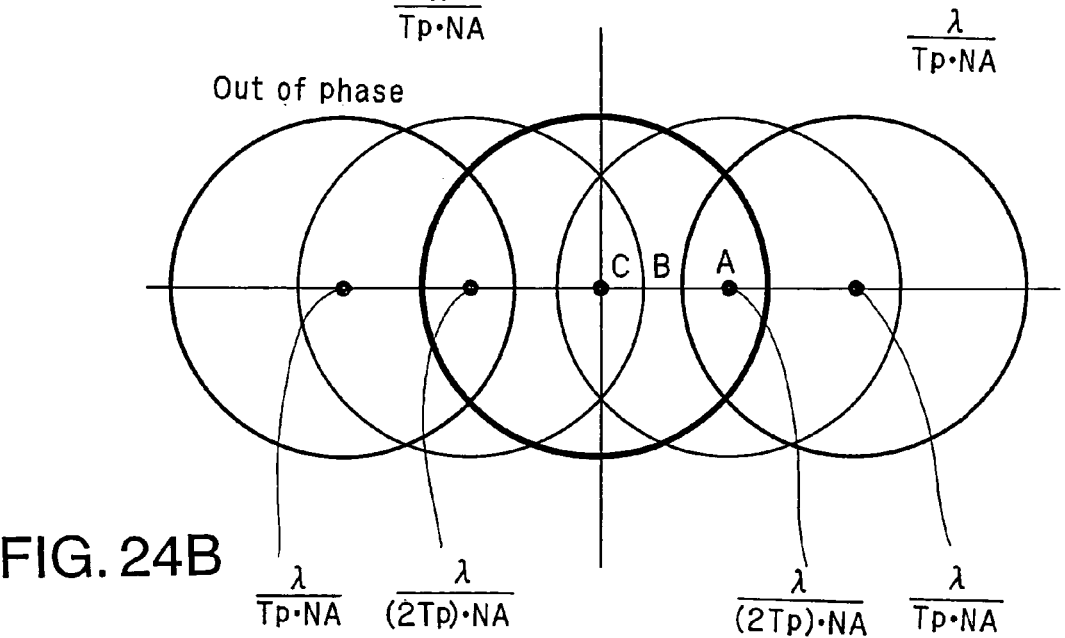
Figure 25:
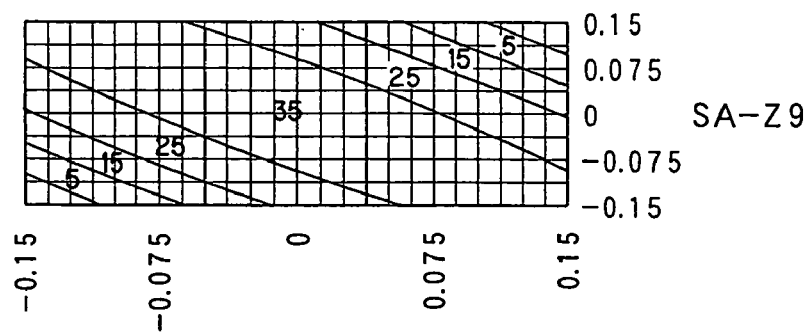
FIG. 25 depicts a graph of two-dimensional distribution showing changes in the wobble amplitude in which the defocusing and the spherical aberration for the in-phase state are used as a reference.

In the case of the two-segment push-pull detection, shown in FIG. 26, the wobble amplitude is doubled in the center portion and fourfold in (Def, SA)=(+, +), (−, −), thus indicating increasing change magnitudes. The non-symmetrical components, such as those generated in the out-of-phase case, are tilted in the orientation different from that of the components generated in the in-phase case in which the amplitude changes are two-dimensionally in phase, so that, if simply the signal components indicated by B and C in FIG. 24B are eliminated, the amplitude is excessively decreased in the orientation of (Def, SA)=(+, −), (−, +), thus indicating counter-effects.

Conversely, with the push-pull detection with an interval, shown in FIG. 9, the changes in the wobble amplitude are approximately 1.5 fold in the center portion and approximately double in the portions of (Def, SA)=(+, +), (−, −), meaning that the changes are of smaller values.

Thus, in the routine two-segment push-pull detection, the two-dimensional margin of the error rate of the pre-formatted signals, such as address signals or the disc information, with respect to the spherical aberration and the defocusing, becomes extremely narrow in a direction towards a smaller value of the wobble amplitude for the in-phase case, whereas, in the push-pull detection with an interval, the two-dimensional margin may be increased in the same direction.

Meanwhile, the optical head 104 is in need of the two-dimensional margin, that is, the margin for defocusing and spherical aberration, ascribable to the error in the thickness of the cover layer, for an optical recording medium, such as the Blue-ray Disc or the multi-layered recording medium, which is premised on the high NA.

In general, the following relationship:

$$\text{spherical aberration} \propto \Delta D \times \{(n^2-1)/n^3\} \times NA^4/\lambda$$

holds for a substrate thickness D, a refractive index n of the substrate, the numerical aperture NA of the objective lens, the wavelength $\lambda$ and the spherical aberration.

If now the numerical aperture NA of the objective lens 220 is 0.85 and the wavelength of the light emitted by the laser light source is 405 nm, the optical recording medium, such as Blue-ray Disc, is significantly deteriorated in characteristics, if the substrate thickness (thickness of the cover layer) up to the recording layer is deviated by a smaller value on the order of several μm, even though the disc is not a double-layer disc. Thus, it is crucial to procure the two-dimensional margin. In the case of a double layer disc with layer thicknesses of e.g. 100 μm and 75 μm, correction of the spherical aberration to a high accuracy is mandatory.

In the light of the aforementioned ratio to the DVD, if a double-layer recording disc with a cover layer thickness deviated by 50 μm, similar to the disc of the ROM type, is used in a DVD, the deviation is equivalent to the deviation of the order of ±4 μm for a system with the numerical aperture NA of the objective lens 220 of 0.85 and the wavelength of light emitted by the laser light source of 405 nm. In this case, it may be presumed that, with the routine two-segment push-pull detection, the defocusing margin of the address is decreased and that the situation is more severe with a multi-layered disc with three or more layers.

The present invention is particularly efficacious for this sort of the optical recording medium, such that it is possible to increase the two-dimensional margin of the error rate for the pre-formatted signals, such as the address signal or the disc information, with respect to the aforementioned spherical aberration and defocusing, and to enlarge the range of allowance for the correction deviations.

Moreover, in the optical recording medium, such as the recordable or rewritable disc, RF signals ascribable to the recording marks, changed in reflectance, are leaked into push-pull detected signals, thus deteriorating the characteristics of the pre-formatted signals. The present invention is highly efficacious in suppressing deterioration in the signal characteristics of the optical recording medium changed in reflectance as a result of recording.

Additionally, even with the above-described optical recording medium with a narrow track pitch, shown in FIG. 24B, deterioration in the signal characteristics may be suppressed by maintaining the signal components A generated in two light spot areas on both sides of the center area of the light spot and by simultaneously removing the signal components B and C generated in the center area of the light spot.

Thus, the effect of the present invention is most outstanding in case the signal component A is separated from the signal component C, that is, in case the relationship $\lambda/(Tp\cdot NA)-1 \geq 1-/(2Tp\cdot NA)$, that is, the relationship $\lambda/(Tp\cdot NA) \geq 4/3$, is satisfied, where Tp is the track pitch of the optical recording medium, $\lambda$ is the wavelength of the light beam radiated from the light source and NA is the numerical aperture of the objective lens.

Figure 10:
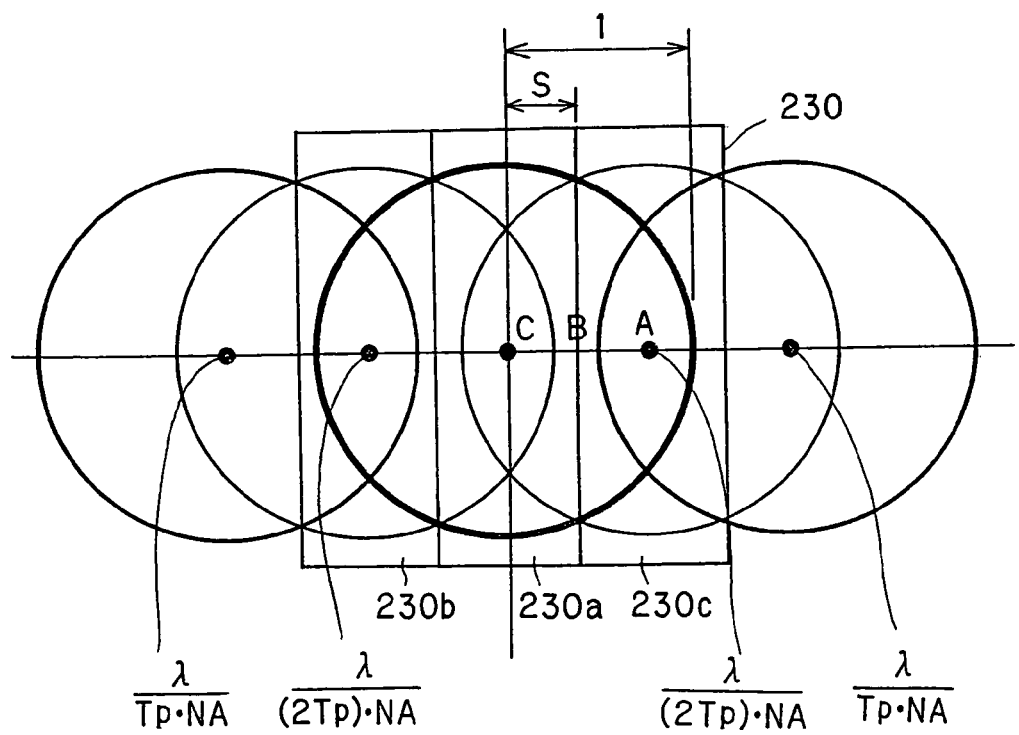
FIG. 10 is a plan view showing the structure of a main light receiving device and the state of a spot.
Figure 11A:
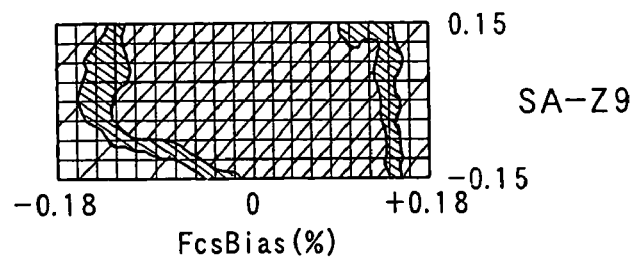
FIG. 11 depicts a graph showing measured results of the two-dimensional margin of the error rate with respect to the defocusing and spherical aberration for the interval ratio of 22.5%.
Figure 11B:
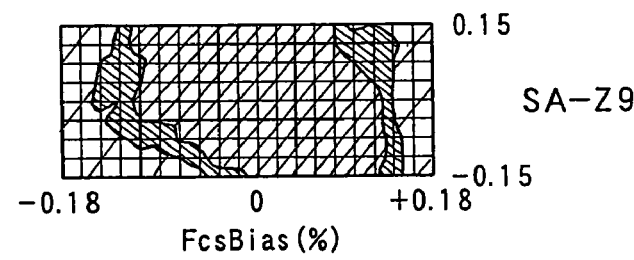

With the optical head 104 embodying the present invention, preferably the relationship: $0 < s \leq \lambda/(Tp\cdot NA)-1$ is satisfied, where the diameter of the light spot of the reflected light beam along the direction perpendicular to the recording track is equal to unity and where the width of the center area of the light spot along the direction perpendicular to the recording track of the center area of the light spot is 2 s, as shown in FIG. 10. It is possible in this manner to maintain the intrinsic wobble signal components, generated in the signal components A shown in FIG. 10, that is, the two light spot areas on both sides of the center area of the light spot.

Moreover, with the present optical head 104, the relationship $1-\lambda/(2Tp\cdot NA) \leq s < 1$ is preferably satisfied. In this manner, the pseudo signal components, represented by the beat generated in the signal components B and C shown in FIG. 10, that is, in the center area of the light spot, may efficiently be removed by the interval area 230a.

Additionally, with the present optical head 104, when the relationship $0 < s \leq \{\lambda/(Tp\cdot NA)-\lambda/(2Tp\cdot NA)\}/2$ is satisfied, it is possible to prevent the interval area 230a from exercising the counter-effect in the direction in which the two-dimensional margin of the error rate with respect to the defocusing and the spherical aberration shown in FIG. 9 becomes extremely narrow.

The two-dimensional margin of the error rate of the address signal with respect to the defocusing and the spherical aberration in case the interval ratio of the interval area 230a shown in FIG. 10 is changed in a range of 32.5%±10% was measured using a recorded area of the rewritable disc. By way of comparison as to the efficacy, measurements were also made of the case of the routine two-segment push-pull detection (interval ratio of 0%). The measured results are shown in FIGS. 11 to 14.

Meanwhile, in the graphs shown in FIGS. 11 to 14, the graphs shown in FIGS. 11A to 14A depict the case following the error correction and the graphs shown in FIGS. 11B to 14B depict the case without error correction. In these graphs, the ordinate and the abscissa plot the quantity of spherical aberration in terms of Z9 equivalent to ±0.15 and the quantity of defocusing in terms of Z4 equivalent to ±0.18.

For the present measurements, the wavelength $\lambda$ is 405 nm, the numerical aperture NA of the objective lens is 0.85, the track pitch Tp of the optical recording medium is 0.32 and the wobble amplitude is ±10 nm. Thus, the width s of the interval of the center area of the light spot by the aforementioned condition relationship $0 < s \leq \{\lambda/(Tp\cdot NA)-1$ is such that $0 < s \leq 0.49$. On the other hand, the width s of the interval of the center area of the light spot by the aforementioned relationship $1-/(2Tp\cdot NA) \leq s \leq 1$ is such that $0.26 \leq s < 1$. The width s of the interval of the center area of the light spot by the aforementioned relationship $0 < s \leq \{\lambda/(Tp\cdot NA)-\lambda/(2Tp\cdot NA)\}/2$ is such that $0 < s \leq 0.37$.

Figure 12A:
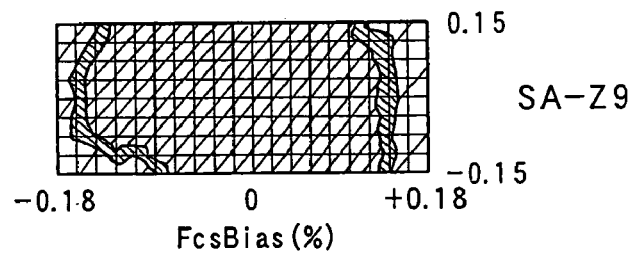
FIG. 12 depicts a graph showing measured results of the two-dimensional margin of the error rate with respect to the defocusing and spherical aberration for the interval ratio of 32.5%.
Figure 12B:
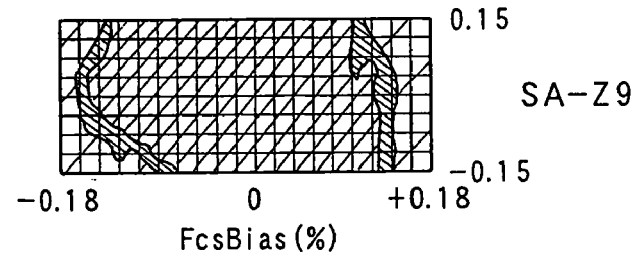

It may be seen from FIGS. 11 to 13 that, with push-pull detection with an interval, the two-dimensional margin of the error rate with respect to spherical aberration and defocusing is appreciably enhanced as compared to the routine two-segment push-pull detection shown in FIG. 14.

Measurements were also made of the two-dimensional margin of the error rate of the address signal with respect to defocusing and spherical aberration in case the disc cutting conditions were slightly offset to deteriorate the wobble signal characteristics. The measured results are shown in FIGS. 15 to 17.

Figure 17A:
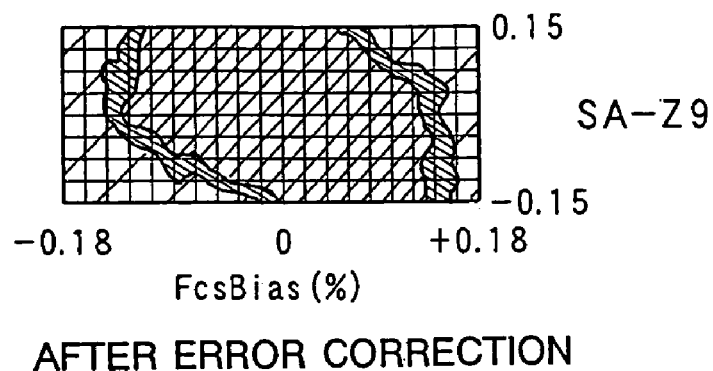
FIG. 17 depicts a graph showing measured results of the two-dimensional margin of the error rate with respect to the defocusing and spherical aberration for the interval ratio of 42.5%, in which wobble signal characteristics have been deteriorated.
Figure 17B:
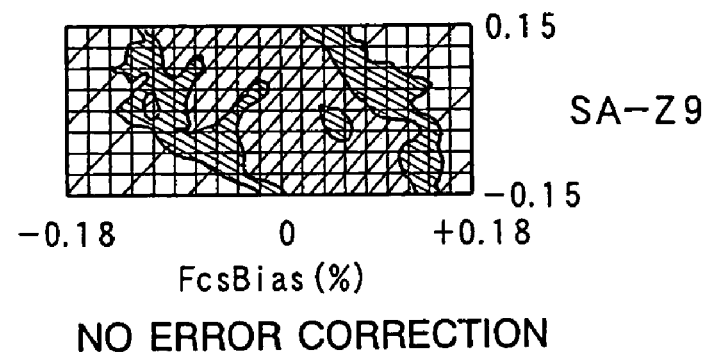

As may be seen from FIGS. 15 to 17, an optical head sample with the interval ratio of 32.5% shows a satisfactory two-dimensional margin of the error rate with respect to spherical aberration and defocusing even in case the wobble signal characteristics have been deteriorated as compared to the cases shown in FIGS. 11 to 13.

Thus, in the aforementioned push-pull detection with an interval, the two-dimensional margin of the error rate with respect to spherical aberration and defocusing is maximum with the interval ratio in the vicinity of 32.5%. This corresponds to about one half of the area of B+C shown in FIG. 24B being the interval area 230a, by way of approximation, and permits the stable margin to be procured with respect to spherical aberration and defocusing.

With the optical head 104 according to the present invention, the stable margin with respect to the spherical aberration and defocusing may be guaranteed by optimizing the width s of the interval area 230a.

Figure 18:
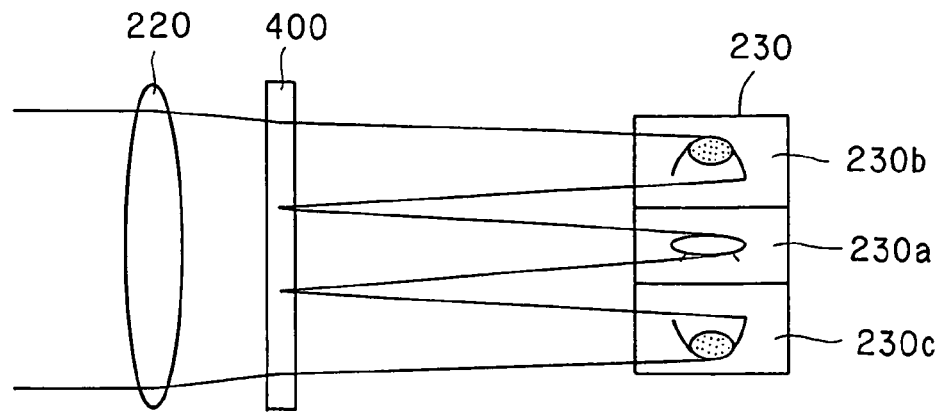
FIG. 18 is a schematic view showing the structure of push-pull detection with an interval employing a diffraction optical component.

With the optical head 104 according to the present invention, such a structure may be used in which the main light beam is split, by using e.g. a diffractive optical device 400, shown in FIG. 18, into a first light beam which is one spot area received by the first light receiving section 230b and into a second light beam which is another spot area received by the second light receiving section 230c, in addition to the aforementioned structure in which the interval area 230a is provided to the photodetector device 223 in order to effect the push-pull detection with the interval.

In such case, push-pull detection with the interval, that is, the push-pull detection excluding the center area of the light spot, may be achieved, thus allowing suppression of variations in the amplitude and phase in the wobble signals.

Figure 19:
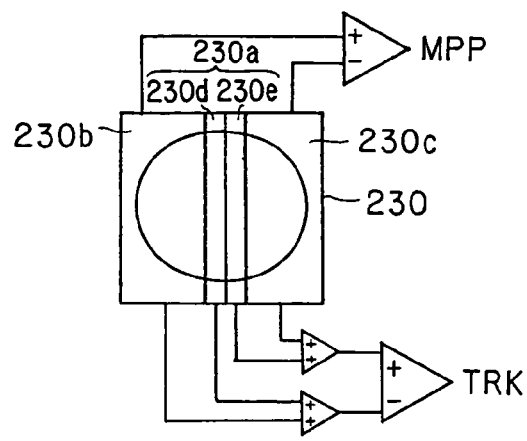
FIG. 19 is a plan view showing another structure of a main light receiving component.
Figure 20:
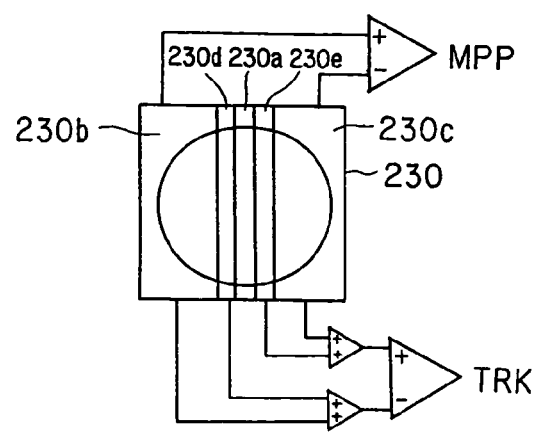
FIG. 20 is a plan view showing yet another structure of a main light receiving component.

According to the present invention, such a structure may also be used in which the interval area of the photodetector device 223 is split into light receiving sections 230d, 230e by a partition line parallel to the recording track, as shown in FIG. 19. In this case, the tracking error signal TRK may be obtained, without being affected by the width of the interval area, by taking a difference between the photodetector signal from the first light receiving section 230b and the photodetector signal from the second light receiving section 230c. Moreover, according to the present invention, an interval area 230a may be provided between the light receiving sections 230d, 230e, for obtaining tracking error signals with a different interval width, as shown in FIG. 20.

Moreover, according to the present invention, the above-described effect by the interval may be acquired not only by a method comprising providing the substantially rectangular interval area along the direction of the recording track, but also by employing a special contrivance in the splitting shape of the light receiving sections in the photodetector device 223 or in the splitting shape of the diffractive optical component 400.

Figure 21:
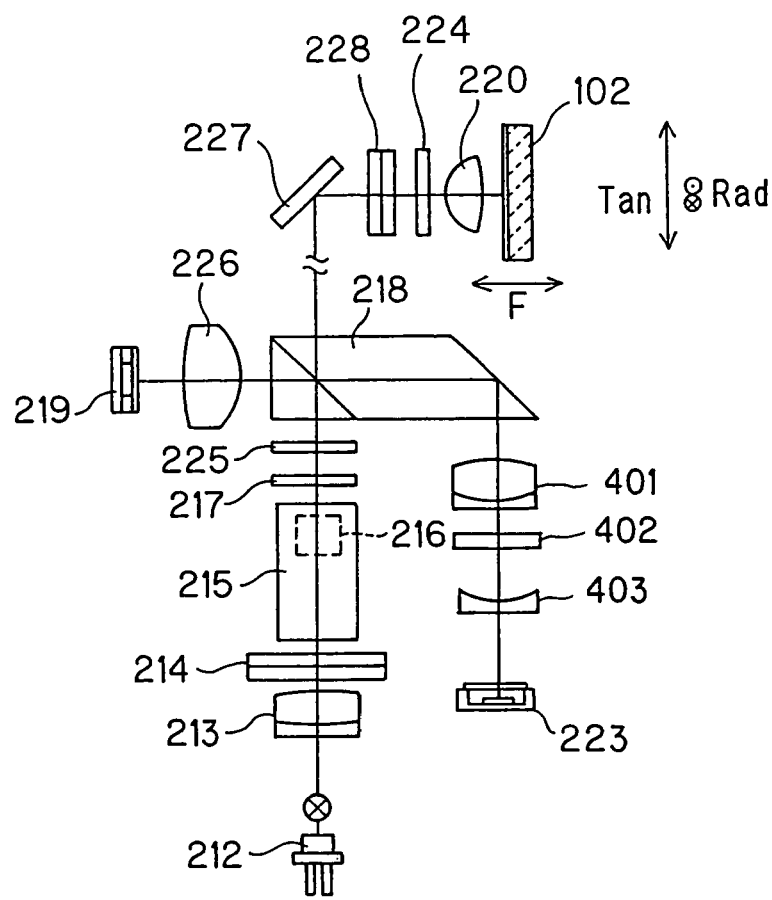
FIG. 21 is a block diagram showing another structure of an optical head.

The optical head 104 according to the present invention may be provided with a collimator lens 401, a holographic optical device 402 and a cylindrical lens 403, in place of the detection lens 221 and the multi-lens 222, in an optical path from the polarizing beam splitter 218 to the optical detection device 223, as shown in FIG. 21.

Figure 22:
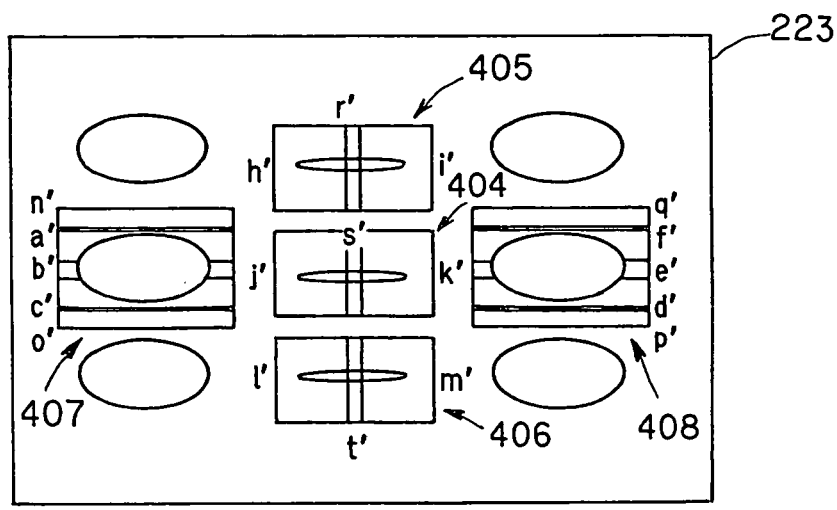
FIG. 22 is a plan view showing a structure of a photodetector device of the optical head shown in FIG. 21.
Figure 23A:
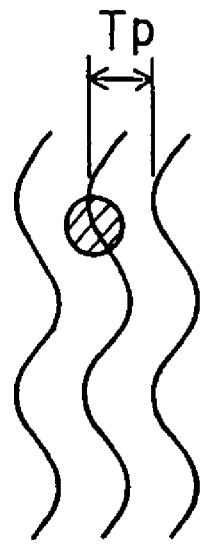
FIGS. 23A and 23B are schematic views showing a case in which the wobbling of two neighboring tracks is in phase with each other and a case in which the wobbling of two neighboring tracks is out of phase with each other, respectively.
Figure 23B:
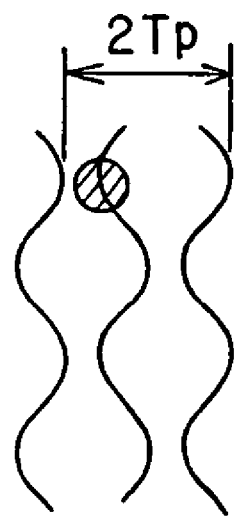

The photodetector device 223 is made up by a first main light receiving device 404 for receiving the main reflected light beam from the main spot, a first subsidiary light receiving device 405 for receiving a first subsidiary light beam from the first subsidiary light spot, a second subsidiary light receiving device 406 for receiving a second subsidiary light beam from the second subsidiary light spot, a second main light receiving device 407 and a third main light receiving device 408 for separately receiving the light beams split from the main reflected light beam from the main spot, as shown in FIG. 22. The splitting of the main reflected light beam to the second main light receiving device 407 and to the third main light receiving device 408 is by the holographic optical device 402 arranged between the collimator lens 401 and the cylindrical lens 403.

Of these light receiving devices, the first main light receiving device 404 is made up by three light receiving sections j', s' and k', divided by division lines parallel to the recording track, for detecting the "wobble signals and the" tracking error signals by the "differential push-pull method" described above. From these three light receiving sections j', s' and k'are output photodetector signals j', s' and k', respectively, independently of one another.

The first subsidiary light receiving device 405 is made up by three light receiving sections h', r'and i', divided by dividing lines extending parallel to the recording track, for detecting tracking error signals by the so-called "differential push-pull method" in conjunction with the first main light receiving device 404. From these three light receiving sections h', r'and i'are output photodetector signals h', r'and i', respectively, independently of one another. In similar manner, the second subsidiary light receiving device 406 is made up by three light receiving sections l', t'and m', divided by dividing lines extending parallel to the recording track. From these three light receiving sections l', t'and m'are output photodetector signals l', t'and m', respectively, independently of one another.

The second main light receiving device 407 is made up by five light receiving sections n', a', b', c'and o', divided by division lines perpendicular to the recording track, for detecting focusing errors by the so-called "spot size detection (SSD) method". From these five light receiving sections n', a', b', c'and o'are output photodetector signals n', a', b', c'and o', respectively, independently of one another. In similar manner, the third main light receiving device 408 is made up by five light receiving sections q', f', e', d'and p', divided by division lines perpendicular to the recording track. From these five light receiving sections q', f', e', d'and p'are output photodetector signals q', f', e', d'and p', respectively, independently of one another.

In this case, the pull-in signals (PI), focusing error signals (FCS), tracking error signals (TRK), RF signals (RF) and wobble signals (WBL), as defined below, are generated, based on photodetector signals, output from the photodetector device 223 based on input light signals.

PI (pull-in signals)=j'+k'+s'
FCS (focusing error signals)={(a'+c'−b−n−o')−(d'+f'−e'−p'−q')}
TRK (tracking error signals)=(j'−k')−K·{(h'−i')+(l'−m')}
RF (RF signals)=j'+k'+s'
WBL (wobble signals)=j'−k'.

The above respective signals may also be output as
I=j'+0.5s'
J=k'+0.5s'
RF=j'+k'+s'
SPI 1=h'+r+i'
SPI 2=l'+t+m'
SPP 1 =h'−i'
SPP 2 =l'−m' using a photodetector device having enclosed a portion of the preamplifier, and the outputs may be exteriorly calculated by $TRK=I-J-K\cdot(SPP\ 1+SPP\ 2)$ (K: proportionality constant)

$WBL=I\cdot J$ $PI=I+J.$

Each of the servo signals may be subjected to AGC (automatic gain (amplitude) control) for stabilizing the aforementioned respective signals against changes in the light volume at the time of pulse recording or changes in the reflectance of the recording layer of the optical disc 102.
FCS (AGC) (focusing error signals subjected to AGC)=FCS/PI
TRK (AGC) (tracking error signals subjected to AGC)=(I−J)/PI−K·(SPP 1/SPI 1+SPP 2/SPI 2).

The present invention may broadly be applied to an optical recording medium in which clock signals, the address information and so forth are pre-formatted by shifting in the transverse direction of the recording track, without being limited to the optical recording medium in which the clock signals, the address information and so forth are pre-formatted by the wobbled recording track. The present invention may also be applied to an optical recording medium in which the information has been pre-formatted by forming pits for the address information in the land portion, such as DVD-R or DVD-RW, for detecting the land pre-pits, for improving signal characteristics.

What is claimed is:

1. An optical head comprising:
   a light source;
   an objective lens configured to condense a light beam, radiated from said light source, to a recording track of said optical recording medium;
   a photodetector configured to receive the light beam reflected back from said recording track; and
   said photodetector includes a first light receiving section, a second light receiving section, and an interval area between said first and second light receiving sections, wherein
   a track pitch Tp of said optical recording medium, the wavelength $\lambda$ of the light beam radiated from said light source, and the numerical aperture NA of said objective lens satisfies the condition $\lambda/(Tp \cdot NA) \geq 4/3$,
   said first light receiving section detects the light of one of two spot areas lying on both sides at a distance $\lambda/(Tp \cdot NA)$ from a center area of a light spot of said reflected light beam passing through the center of the light spot for extending along the length of said recording track,
   said second light receiving section detects the light of the other of said two light spot areas,
   said interval area detects the light corresponding to the width of said center area of said light spot, and
   said photodetector is configured to generate a push pull signal without including the detected light corresponding to the width of said center area of said light spot.

2. The optical head according to claim 1 wherein said pre-formatted signals are wobble signals recorded on frequency modulation or phase modulation of the wobbling of the wobbled recording track.

3. The optical head according to claim 1 wherein, with the radius of the light spot of said reflected light beam along the direction perpendicular to said recording track equal to unity and with the width of the center area of said light spot extending along the direction perpendicular to said recording track equal to 2s, the relationship of $0 < s \leq \lambda/(Tp \cdot NA) - 1$ is satisfied.

4. The optical head according to claim 1 wherein, with the radius of the light spot of said reflected light beam along the direction perpendicular to said recording track equal to unity and with the width of the center area of said light spot extending along the direction perpendicular to said recording track equal to 2s, the relationship of $1 - \lambda/(2Tp \cdot NA) \leq s < 1$ is satisfied.

5. The optical head according to claim 1 wherein, with the radius of the light spot of said reflected light beam along the direction perpendicular to said recording track equal to unity and with the width of the center area of said light spot extending along the direction perpendicular to said recording track equal to 2s, the relationship of $0 < s \geq \{\lambda/(Tp \cdot NA) - \lambda/(2Tp \cdot NA)\}/2$ is satisfied.

6. The optical head according to claim 1 wherein, with the radius of the light spot of said reflected light beam along the direction perpendicular to said recording track equal to unity and with the width of the center area of said light spot extending along the direction perpendicular to said recording track equal to 2s, the relationship of $1 - \lambda/(2Tp \cdot NA) \leq s \leq \lambda/(TpNA) - 1$ is satisfied.

7. The optical head according to claim 1 wherein, with the radius of the light spot of said reflected light beam along the direction perpendicular to said recording track equal to unity and with the width of the center area of said light spot extending along the direction perpendicular to said recording track equal to 2s, the relationship of $1\lambda/(2Tp \cdot NA) \leq s \leq \{(\lambda Tp \cdot NA)\}/2$ is satisfied.

8. The optical head according to claim 1 further comprising
   a diffractive optical device for splitting said reflected light beam into a first light beam corresponding to said one spot area of said reflected light beam received by said first light receiving section and into a second light beam corresponding to said other spot area of said reflected light beam received by said second light receiving section.

9. A recording and/or reproducing apparatus comprising:
   an optical head for writing and/or reading out the information signals for a preset recording track as said pre-formatted signals are push-pull detected from said optical recording medium;
   said optical head comprising
   a light source, an objective lens configured to condense a light beam, radiated from said light source, to a recording track of said optical recording medium;
   a photodetector configured to receive the light beam reflected back from said recording track; and
   said photodetector comprising a first light receiving section, a second light receiving section, and an interval area between said first and second light receiving sections, wherein
   a track pitch Tp of said optical recording medium, the wavelength $\lambda$ of the light beam radiated from said light source, and the numerical aperture NA of said objective lens satisfies the condition $\lambda/(Tp \cdot NA) \geq 4/3$,
   said first light receiving section detects the light of one of two spot areas lying on both sides at a distance $\lambda(Tp \cdot NA)$ from a center area of a light spot of said reflected light beam passing through the center of the light spot for extending along the length of said recording track,
   said second light receiving section detects the light of the other of said two light spot areas,
   said interval area detects the light corresponding to the width of said center area of said light spot, and
   said photodetector is configured to generate a push pull signal without including the detected light corresponding to the width of said center area of said light spot.

10. An optical head comprising:
    a light source;
    an objective lens configured to condense a light beam, radiated from said light source, to a recording track of said optical recording medium;
    a photodetector configured to receive the light beam reflected back from said recording track; and
    said photodetector includes a first light receiving section a second light receiving section, wherein
    with a track pitch Tp of said optical recording medium, the wavelength $\lambda$ of the light beam radiated from said light source, the numerical aperture NA of said objective lens and $\lambda(Tp \cdot NA) \geq 4/3$,
    said first light receiving section detects the light of one of two spot areas lying on both sides of a center area of a light spot of said reflected light beam passing through the center of the light spot for extending along the length of said recording track,
    said second light receiving section detects the light of the other of said two light spot areas, and
    with the radius of the light spot of said reflected light beam along the direction perpendicular to said recording track equal to unity and with the width of the center area of said light spot extending along the direction perpendicular to said recording track equal to 2s, the relationship of $0<s\leq\lambda/(Tp\cdot NA)-1$ is satisfied.

11. An optical head comprising:
a light source;
an objective lens configured to condense a light beam, radiated from said light source, to a recording track of said optical recording medium;
a photodetector configured to receive the light beam reflected back from said recording track; and
said photodetector includes a first light receiving section a second light receiving section, wherein
with a track pitch Tp of said optical recording medium, the wavelength λ of the light beam radiated from said light source, the numerical aperture NA of said objective lens and $\lambda/(Tp\cdot NA)\geq 4/3$,
said first light receiving section detects the light of one of two spot areas lying on both sides of a center area of a light spot of said reflected light beam passing through the center of the light spot for extending along the length of said recording track,
said second light receiving section detects the light of the other of said two light spot areas, and
with the radius of the light spot of said reflected light beam along the direction perpendicular to said recording track equal to unity and with the width of the center area of said light spot extending along the direction perpendicular to said recording track equal to 2s, the relationship of $1-\lambda/(2Tp\cdot NA)\leq s<1$ is satisfied.

12. An optical head comprising:
a light source;
an objective lens configured to condense a light beam, radiated from said light source, to a recording track of said optical recording medium;
a photodetector configured to receive the light beam reflected back from said recording track; and
said photodetector includes a first light receiving section a second light receiving section, wherein
with a track pitch Tp of said optical recording medium, the wavelength λ of the light beam radiated from said light source, the numerical aperture NA of said objective lens and with $\lambda/(Tp\cdot NA)\geq 4/3$,
said first light receiving section detects the light of one of two spot areas lying on both sides of a center area of a light spot of said reflected light beam passing through the center of the light spot for extending along the length of said recording track,
said second light receiving section detects the light of the other of said two light spot areas, and
with the radius of the light spot of said reflected light beam along the direction perpendicular to said recording track equal to unity and with the width of the center area of said light spot extending along the direction perpendicular to said recording track equal to 2s, the relationship of $0<s\leq\{\lambda/(Tp\cdot NA)-\lambda/(2Tp\cdot NA)\}/2$ is satisfied.

13. An optical head comprising:
a light source;
an objective lens configured to condense a light beam, radiated from said light source, to a recording track of said optical recording medium;
a photodetector configured to receive the light beam reflected back from said recording track; and
said photodetector includes a first light receiving section and a second light receiving section, wherein
with a track pitch Tp of said optical recording medium, the wavelength λ of the light beam radiated from said light source, the numerical aperture NA of said objective lens and $\lambda/(Tp\cdot NA)\geq 4/3$,
said first light receiving section detects the light of one of two spot areas lying on both sides of a center area of a light spot of said reflected light beam passing through the center of the light spot for extending along the length of said recording track,
said second light receiving section detects the light of the other of said two light spot areas, and
with the radius of the light spot of said reflected light beam along the direction perpendicular to said recording track equal to unity and with the width of the center area of said light spot extending along the direction perpendicular to said recording track equal to 2s, the relationship of $1-\lambda/(2Tp\cdot NA)\leq s\leq\lambda/(Tp\cdot NA)-1$ is satisfied.

14. An optical head comprising:
a light source;
an objective lens configured to condense a light beam, radiated from said light source, to a recording track of said optical recording medium;
a photodetector configured to receive the light beam reflected back from said recording track; and
said photodetector includes a first light receiving section a second light receiving section, wherein
with a track pitch Tp of said optical recording medium, the wavelength λ of the light beam radiated from said light source, the numerical aperture NA of said objective lens and $\lambda/(Tp\cdot NA)\geq 4/3$,
said first light receiving section detects the light of one of two spot areas lying on both sides of a center area of a light spot of said reflected light beam passing through the center of the light spot for extending along the length of said recording track,
said second light receiving section detects the light of the other of said two light spot areas, and
with the radius of the light spot of said reflected light beam along the direction perpendicular to said recording track equal to unity and with the width of the center area of said light spot extending along the direction perpendicular to said recording track equal to 2s, the relationship of $1-\lambda/(2Tp\cdot NA)\leq s\leq\{\lambda/(Tp\cdot NA)-\lambda/(2Tp\cdot NA)\}/2$ is satisfied.

15. An optical head comprising:
a light source;
an objective lens configured to condense a light beam, radiated from said light source, to a recording track of said optical recording medium;
a photodetector means for receiving the light beam reflected back from said recording track; and
said photodetector means includes a first light receiving section, a second light receiving section, and an interval area between said first and second light receiving sections, wherein
a track pitch Tp of said optical recording medium, the wavelength λ of the light beam radiated from said light source, and the numerical aperture NA of said objective lens satisfies the condition $\lambda/(Tp\cdot NA)\geq 4/3$,
said first light receiving section detects the light of one of two spot areas lying on both sides at a distance λ/(TpNA) from a center area of a light spot of said reflected light beam passing through the center of the light spot for extending along the length of said recording track, said second light receiving section detects the light of the other of said two light spot areas, said interval area detects the light corresponding to the width of said center area of said light spot, and said photodetector means generates a push pull signal without including the detected light corresponding to the width of said center area of said light spot.

* * * * *

UNITED STATES PATENT AND TRADEMARK OFFICE
CERTIFICATE OF CORRECTION

| | | |
|---|---|---|
| PATENT NO. | : 7,280,449 B2 | Page 1 of 1 |
| APPLICATION NO. | : 10/794336 | |
| DATED | : October 9, 2007 | |
| INVENTOR(S) | : Noriaki Nishi et al. | |

It is certified that error appears in the above-identified patent and that said Letters Patent is hereby corrected as shown below:

Column 24, line 35, change "$\lambda(Tp \cdot NA)$" to --$\lambda / (Tp \cdot NA)$--.

Column 24, line 58, change "$\lambda(Tp \cdot NA) \geqq 4/3$" to --$\lambda / (Tp \cdot NA) \geqq 4/3$--.

Signed and Sealed this

Twenty-fourth Day of June, 2008

JON W. DUDAS
*Director of the United States Patent and Trademark Office*